United States Patent
Johnson et al.

(10) Patent No.: US 12,128,607 B2
(45) Date of Patent: Oct. 29, 2024

(54) SYSTEMS AND METHODS FOR ADDITIVE MANUFACTURING

(71) Applicant: Continuous Composites Inc., Coeur d'Alene, ID (US)

(72) Inventors: Maxwell Joseph Johnson, Hayden, ID (US); Nathan Andrew Stranberg, Post Falls, ID (US); Ryan C. Stockett, Spokane, WA (US); Mikel Negugogor, Logan, UT (US); Chase Bosman, Post Falls, ID (US); Logan Lalonde, Post Falls, ID (US); Stephen Tyler Wilson, Coeur D'Alene, ID (US); Christopher Losee, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 68 days.

(21) Appl. No.: 18/047,492

(22) Filed: Oct. 18, 2022

(65) Prior Publication Data

US 2023/0121549 A1    Apr. 20, 2023

Related U.S. Application Data

(60) Provisional application No. 63/262,802, filed on Oct. 20, 2021.

(51) Int. Cl.
  *B29C 64/118*    (2017.01)
  *B33Y 10/00*    (2015.01)
  (Continued)

(52) U.S. Cl.
  CPC ............ *B29C 64/118* (2017.08); *B33Y 10/00* (2014.12); *B33Y 70/10* (2020.01); *B33Y 80/00* (2014.12); *B29K 2105/08* (2013.01)

(58) Field of Classification Search
  CPC .... B29C 64/118; B33Y 10/00; B29K 2105/08
  See application file for complete search history.

(56) References Cited

U.S. PATENT DOCUMENTS 3,286,305 A    11/1966    Seckel
3,809,514 A    5/1974    Nunez
(Continued)

FOREIGN PATENT DOCUMENTS

DE    4102257 A1    7/1992
EP    2589481 B1    1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Alison L Hindenlang
*Assistant Examiner* — Keran V Nguyen
(74) *Attorney, Agent, or Firm* — Ryan C. Stockett

(57) ABSTRACT

A method is disclosed for manufacturing a joint. The method may include depositing a first path of composite material within a first layer at the joint. The first path may have a center at a center of the joint, a first portion integral with the center portion and extending away from the center portion, and a second portion integral with the center and extending away from the center portion. The method may further include depositing a second path of composite material within the first layer at the joint. The second path may have a center at the center of the joint, and a first portion integral with the center of the second path and extending away from the center of the second path. The center portion of the
(Continued)

second path may be parallel with, abut and be bonded to the center portion of the first path.

19 Claims, 20 Drawing Sheets

(51) Int. Cl.
  *B33Y 70/10* (2020.01)
  *B33Y 80/00* (2015.01)
  *B29K 105/08* (2006.01)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,137,354 A | 1/1979 | Mayes, Jr. et al. |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,081,129 B1 | 9/2018 | Alvarado et al. |
| 10,532,511 B2 | 1/2020 | Patrov |
| 10,611,079 B2 | 4/2020 | August |
| 11,046,035 B2 | 6/2021 | Nandu |
| 11,237,542 B2 | 2/2022 | Mark et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0176123 A1 | 6/2016 | Pedigo et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |

(56) References Cited

U.S. PATENT DOCUMENTS

| | | |
|---|---|---|
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0165917 A1* | 6/2017 | McKiel, Jr. ............ B29C 64/393 |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2019/0255764 A1 | 8/2019 | August |
| 2020/0023597 A1 | 1/2020 | Nandu |
| 2021/0046694 A1 | 2/2021 | Rowe et al. |
| 2022/0111588 A1 | 4/2022 | Stockett et al. |

FOREIGN PATENT DOCUMENTS

| | | | |
|---|---|---|---|
| EP | 3219474 A1 | 9/2017 | |
| KR | 100995983 B1 | 11/2010 | |
| KR | 101172859 81 | 8/2012 | |
| WO | 2013017284 A2 | 2/2013 | |
| WO | 2016088042 A1 | 6/2016 | |
| WO | 2016088048 A1 | 6/2016 | |
| WO | 2016110444 A1 | 7/2016 | |
| WO | 2016159259 A1 | 10/2016 | |
| WO | 2016196382 A1 | 12/2016 | |
| WO | 2017006178 A1 | 1/2017 | |
| WO | 2017006324 A1 | 1/2017 | |
| WO | 2017051202 A1 | 3/2017 | |
| WO | 2017077508 A1 | 5/2017 | |
| WO | 2017081253 A1 | 5/2017 | |
| WO | 2017085649 A1 | 5/2017 | |
| WO | 2017087663 A1 | 5/2017 | |
| WO | 2017108758 A1 | 6/2017 | |
| WO | 2017122941 A1 | 7/2017 | |
| WO | 2017122942 A1 | 7/2017 | |
| WO | 2017122943 A1 | 7/2017 | |
| WO | 2017123726 A1 | 7/2017 | |
| WO | 2017124085 A1 | 7/2017 | |
| WO | 2017126476 A1 | 7/2017 | |
| WO | 2017126477 A1 | 7/2017 | |
| WO | 2017137851 A2 | 8/2017 | |
| WO | 2017142867 A1 | 8/2017 | |
| WO | 2017150186 A1 | 9/2017 | |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Jan. 31, 2020 for PCT/US2019/057412 to Continuous Composites Inc. Filed Oct. 22, 2019.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

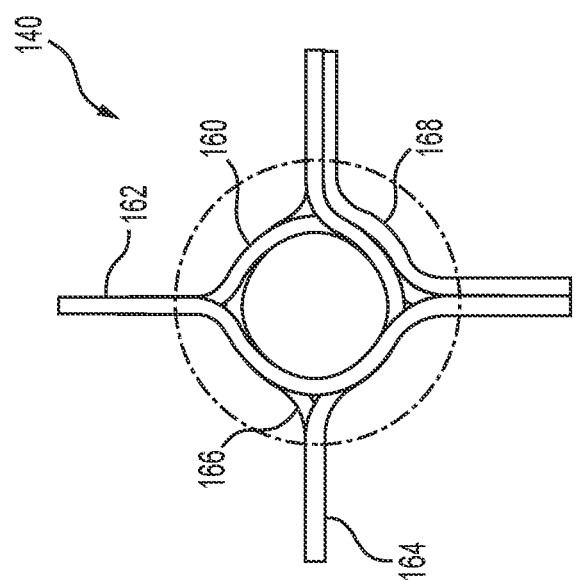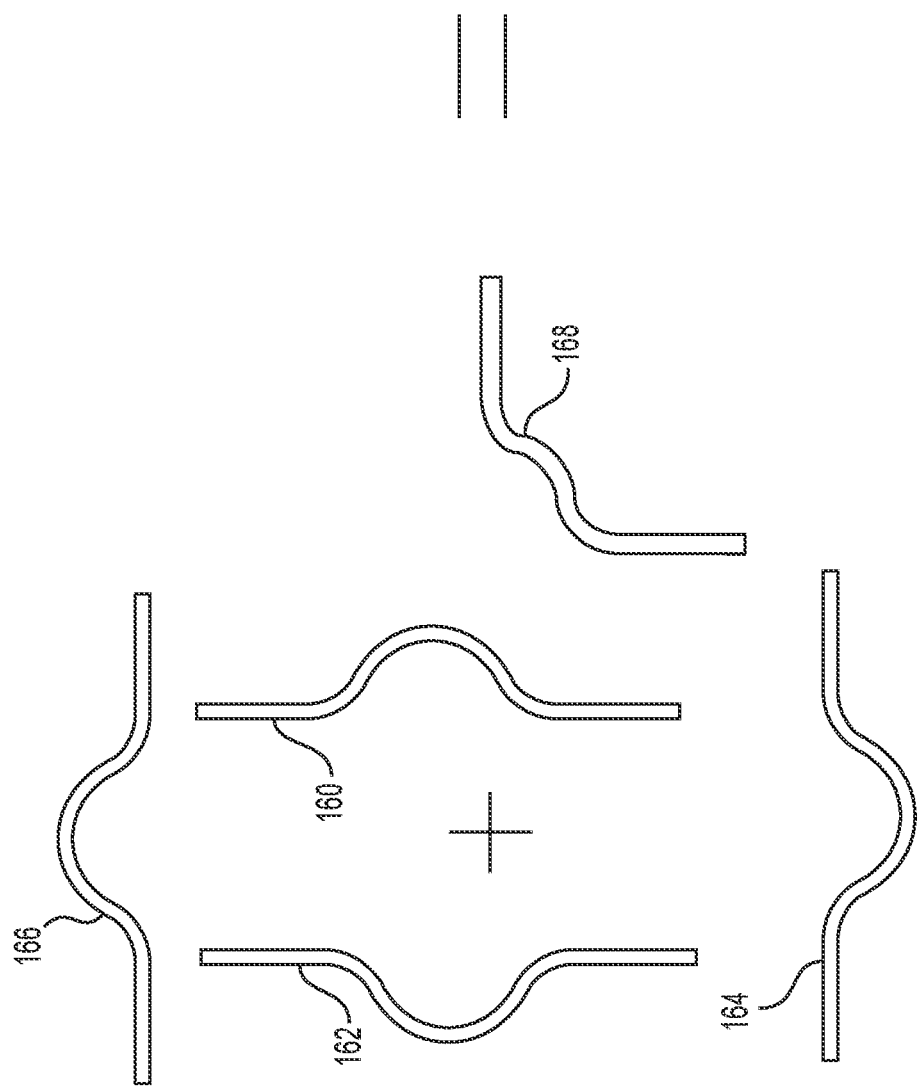
FIG. 10

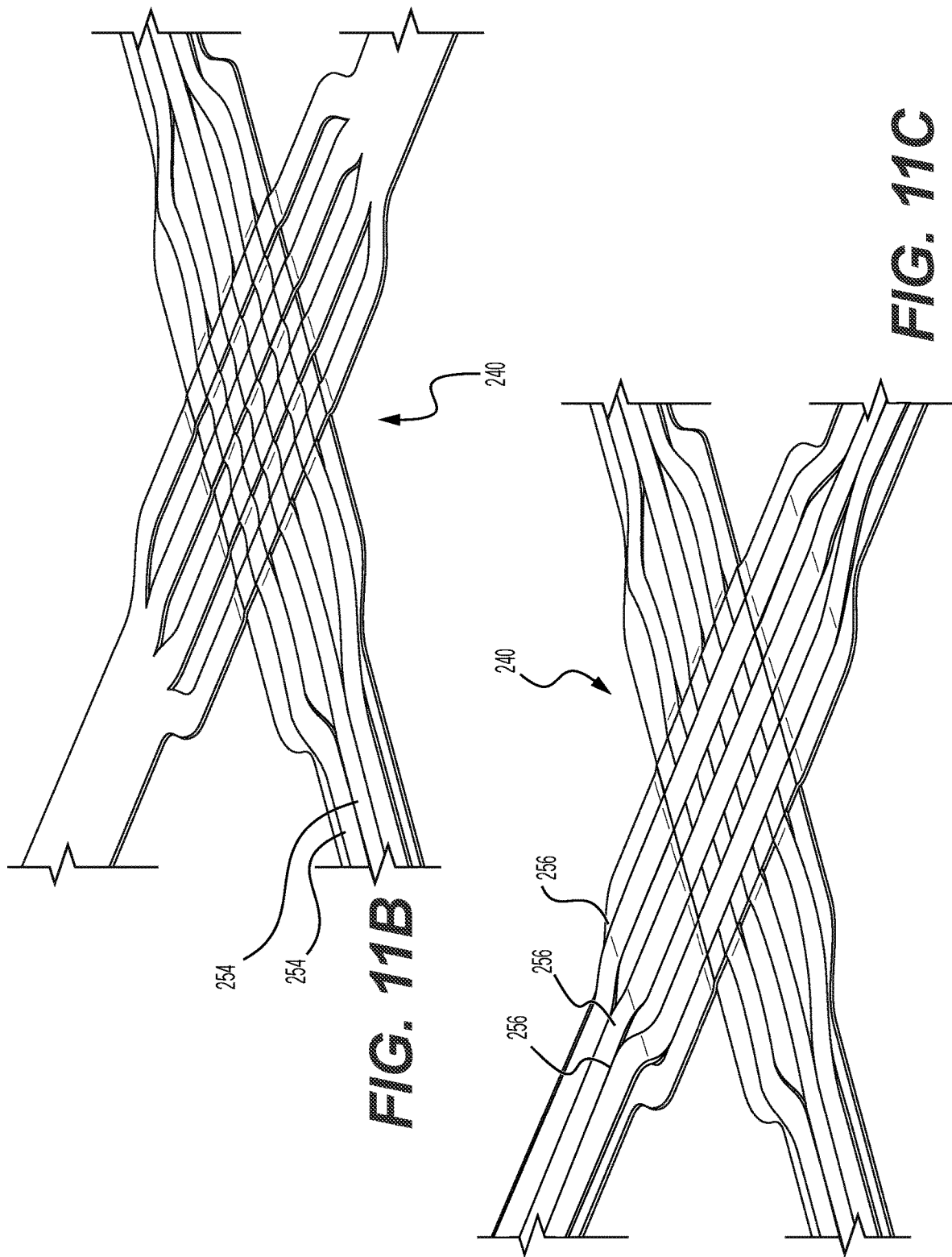

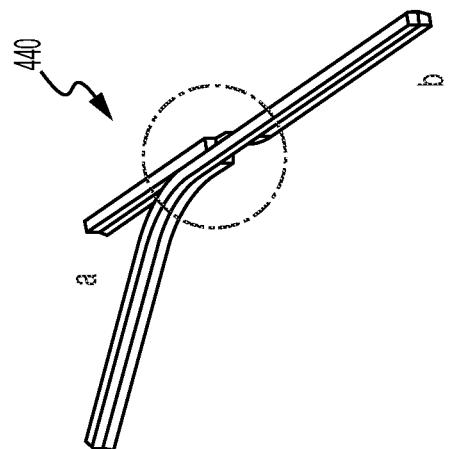
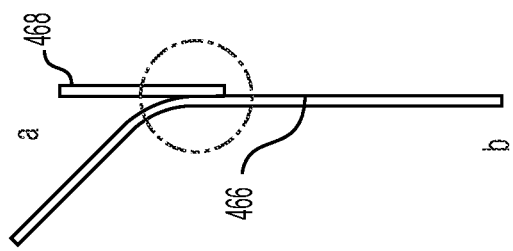
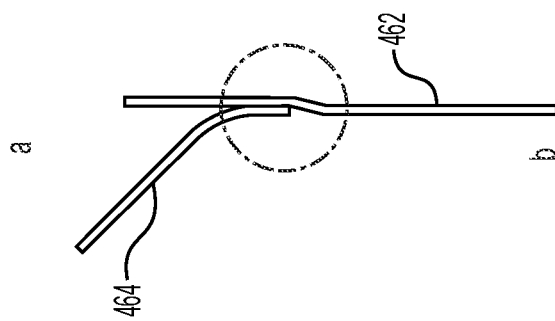
FIG. 15

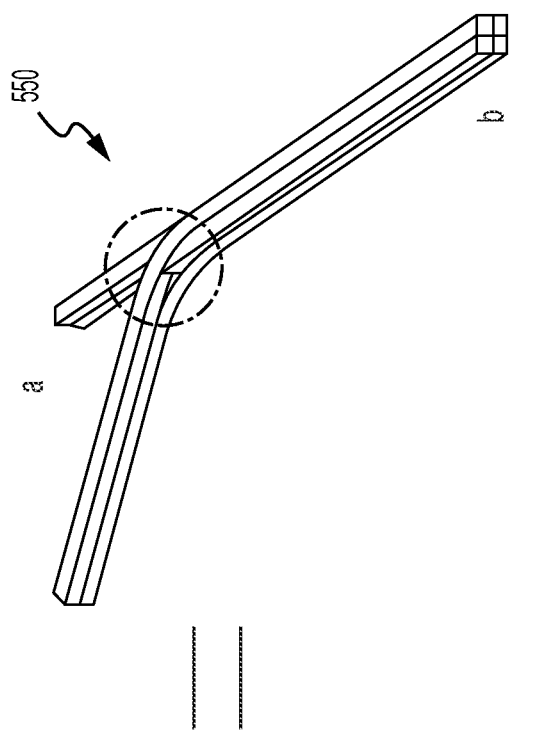
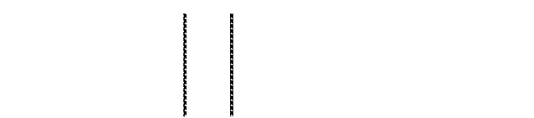
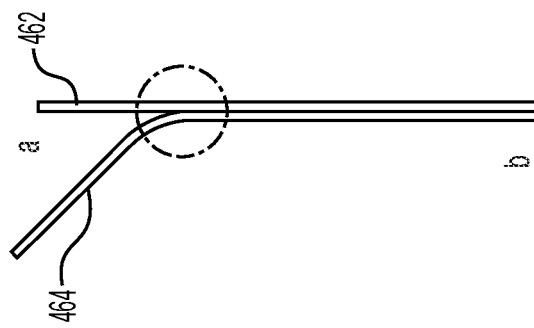
FIG. 16

SYSTEMS AND METHODS FOR ADDITIVE MANUFACTURING

RELATED APPLICATION

This application is based on and claims the benefit of priority from U.S. Provisional Application No. 63/262,802 that was filed on Oct. 20, 2021, the contents of which are expressly incorporated herein by reference.

TECHNICAL FIELD

The present disclosure relates generally to systems and methods for additive manufacturing, as well as the resultant structures formed by such systems and methods.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape (a.k.a., paths) of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous reinforcements (e.g., fibers) embedded within material discharging from the print head. For example, a matrix can be supplied to the print head and discharged (e.g., extruded and/or pultruded) along with one or more continuous reinforcements also passing through the print head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, a laser, an ultrasonic emitter, a heat source, a catalyst supply, etc.) is activated to initiate and/or complete curing (e.g., hardening, cross-linking, sintering, etc.) of the matrix. This curing, when completed quickly enough, can allow for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

When fabricating such structures with continuous reinforcement, layers may be deposited one on top of the other, cumulatively. However, where one path of composite material intersects and crosses over another path within the same layer, a "bump" (e.g., a deviation in effective height of the layer) may result. These bumps cause unevenness in the layer and can propagate as further layers are additionally overlapped. If unaccounted for, the structure may suffer from structural weakness and/or a poor surface finish.

The disclosed systems, methods and structures are directed to addressing ways of additive manufacturing systems that improve on those disclosed in the '543 patent and/or other methods or systems known in the art.

SUMMARY

In one aspect, this disclosure is related to a method for additively manufacturing of a joint within a structure using a composite material. The method may include depositing a first path of the composite material within a first layer at the joint. The first path may have a center portion at a center of the joint, a first portion integral with the center portion and extending away from the center portion, and a second portion integral with the center portion and extending away from the center portion opposite the first portion. The method may further include depositing a second path of the composite material within the first layer at the joint. The second path may have a center portion at the center of the joint, and a first portion integral with the center portion of the second path and extending away from the center portion of the second path. The center portion of the second path may be parallel with, abut and be bonded to the center portion of the first path.

BRIEF DESCRIPTION OF THE DRAWINGS

FIGS. 4, 5, 6, 7 8, 9, 10, 11A, 11B and 11C are diagrammatic examples of joints that may be formed by the system of FIGS. 1 and 2 and incorporated into the structure of FIG. 3;

FIGS. 14, 15, 16, 17, 18, 19, and 20 are diagrammatic examples of additional joints that may be formed by the system of FIGS. 1 and 2 and incorporated into the structure of FIG. 3;

DETAILED DESCRIPTION

Figure 1:
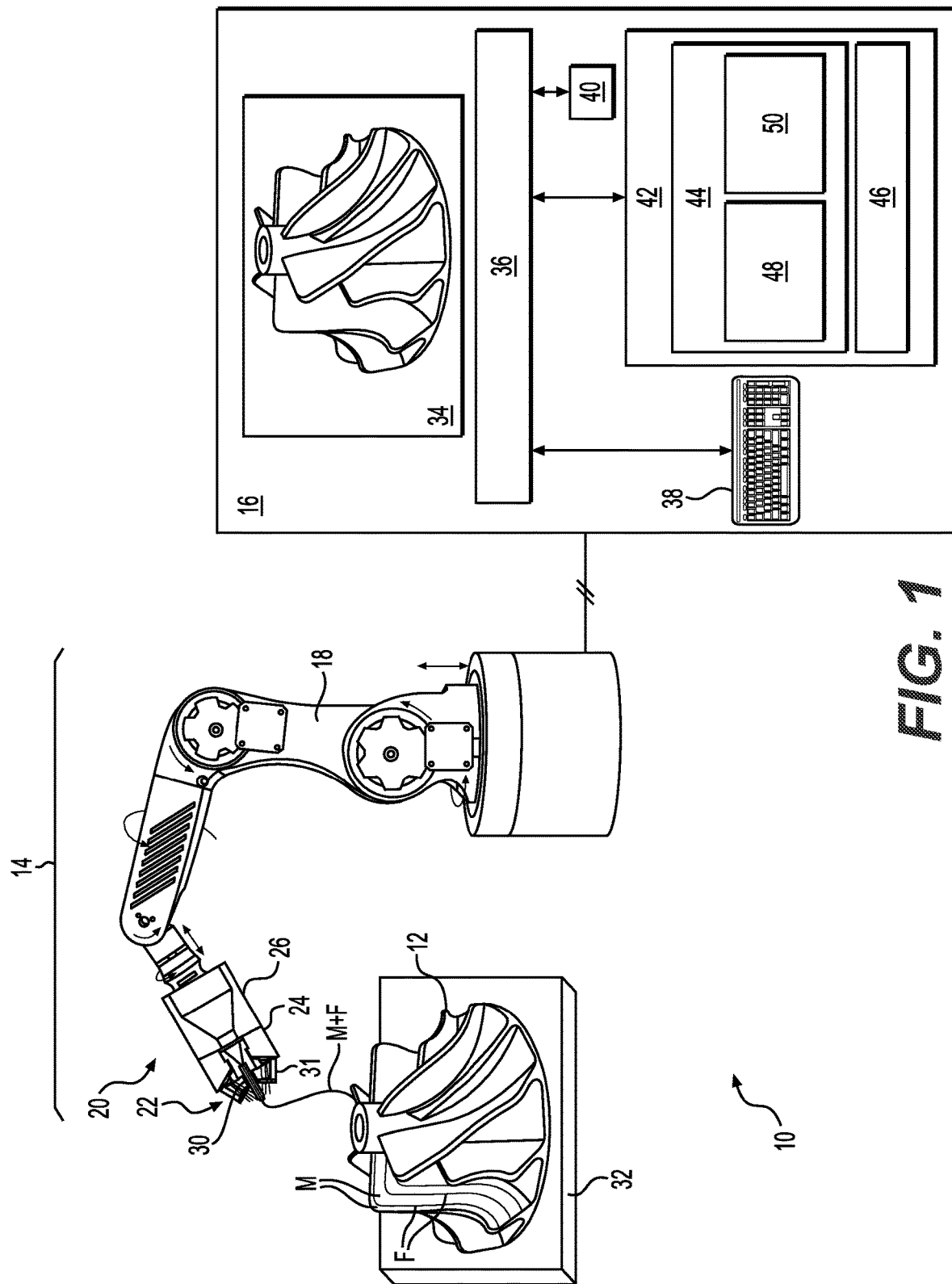
FIG. 1 is a diagrammatic illustration of an exemplary disclosed additive manufacturing system.

FIG. 1 illustrates an exemplary system ("system") 10, which may be used to design, plan, fabricate, and/or analyze a structure 12 having any desired shape, size, consist, and functionality. System 10 may include, among other things, an additive manufacturing machine ("machine") 14 and at least one computing device 16 operatively connected to machine 14. Machine 14 may be configured to create structure 12 under the guided control of computing device 16, for example by way of an additive manufacturing process. Although additive manufacturing processes utilizing one or more continuous reinforcements (e.g., fibers—F) and one or more curable matrixes (M) will be described below as examples of how structure 12, or other structures, may be created, it should be noted that other processes known in the art could alternatively be utilized for this purpose and benefit from the disclosed system and control methods.

Machine 14 may be comprised of components that are controllable to create structure 12 layer-by-layer and/or in free space (e.g., without the bracing of an underlying layer). These components may include, among other things, a support 18 and any number of heads 20 coupled to and/or powered by support 18. In the disclosed embodiment of FIG. 1, support 18 is a robotic arm capable of moving head 20 in multiple directions during fabrication of structure 12. It should be noted that any other type of support (e.g., a gantry, an arm/gantry combination, etc.) capable of moving head 20 in the same or in a different manner could also be utilized, if desired.

Each head 20 (only one shown in FIG. 1, for clarity) may be configured to discharge at least a matrix (e.g., a liquid resin, such as a zero volatile organic compound resin; a powdered metal; etc.) that is curable. Exemplary curable matrixes include a thermoset polymer, single- or multi-part epoxy resins, polyester resins, cationic epoxies, acrylated epoxies, urethanes, esters, a thermoplastic polymer, photopolymers, polyepoxides, thiols, alkenes, thiol-enes, and more. In one embodiment, the matrix inside each head 20 may be pressurized, for example by an external device (e.g., an extruder or another type of pump—not shown) that is fluidly connected to head 20 via a corresponding conduit (not shown). In another embodiment, however, the pressure may be generated completely inside of head 20 by a similar type of device. In yet other embodiments, the matrix may be gravity-fed through and/or mixed within head 20. In some instances, the matrix inside head 20 may need to be kept cool and/or dark to inhibit premature curing; while in other instances, the matrix may need to be kept warm and/or light for the same reason. In either situation, head 20 may be specially configured (e.g., insulated, temperature controlled, shielded, etc.) to provide for these needs.

In some embodiments, the matrix may be mixed with, contain, or otherwise at least partially wet or coat one or more reinforcements (e.g., continuous fibers). Fibers may be in the form of individual fibers, braids, tows, rovings, sleeves, ribbons, and/or sheets of material and, together with the matrix, make up at least a portion (e.g., a wall) of structure 12. The reinforcement may be stored within (e.g., on one or more separate internal spools—not shown) or otherwise passed through head 20 (e.g., fed from one or more external spools). When multiple fibers are simultaneously used as reinforcement, the fibers may be of the same type and have the same diameter, cross-sectional shape (e.g., circular, rectangular, triangular, etc.), and sizing, or be of a different type with different diameters, cross-sectional shapes, and/or sizing. The reinforcement may include, for example, aramid fibers, carbon fibers, vegetable fibers, wood fibers, mineral fibers, glass fibers, metallic wires, optical tubes, etc. It should be noted that the term "reinforcement" is meant to encompass both structural and non-structural (e.g., functional) types of continuous reinforcements that can be at least partially encased in the matrix discharging from head 20. While the reinforcement passing through machine 14 may be considered continuous, it may be selectively cut by machine 14 at desired lengths based on the design of structure 12. For example, cuts may be made by machine 14 as paths of material are deposited in layers based on a size and/or shape of the layer being fabricated.

The reinforcement (e.g., the fibers) may be exposed to (e.g., at least partially wetted, coated with, and/or fully saturated in) the matrix while inside head 20, while being passed to head 20, and/or while being discharging from head 20, as desired. The matrix, dry fibers, and/or fibers that are already exposed to the matrix (e.g., pre-impregnated fibers) may be transported into head 20 in any manner apparent to one skilled in the art.

Support 18 may move head 20 in a particular trajectory corresponding to an intended shape, size, and/or function of structure 12 at the same time that the matrix-wetted reinforcement discharges from head 20. In this way, one or more paths of matrix-wetted reinforcement are formed along the trajectory. Each path may have any cross-sectional shape, diameter, and/or reinforcement-to-matrix ratio, and the reinforcement (e.g., fibers) may be radially dispersed with the matrix, located at a general center thereof, or located only at a periphery.

One or more cure enhancers (e.g., a UV light, a laser, an ultrasonic emitter, a temperature regulator, a catalyst dispenser, etc.) 22 may be mounted proximate (e.g., within, on, and/or adjacent) head 20 and configured to enhance a cure rate and/or quality of the matrix as it discharges from head 20. Cure enhancer(s) 22 may be regulated to selectively expose surfaces of structure 12 to a desired type, intensity, and/or dosage of energy (e.g., to UV light, electromagnetic radiation, vibrations, heat, coolant, a chemical catalyst or hardener, etc.) during the formation of structure 12. The energy may trigger a cross-linking chemical reaction within the matrix, increase a rate of chemical reaction occurring within the matrix, sinter the matrix, harden the matrix, or otherwise cause the matrix to cure as it discharges from head 20. In the depicted embodiments, cure enhancer(s) 22 include one or more sources of light (e.g., UV radiation) that are equally distributed about a center axis of and/or trailing head 20. However, it is contemplated that any number of cure sources of any type could alternatively be utilized for the disclosed purposes and/or arranged in another manner (e.g., unequally distributed, arranged in a row, only leading, only trailing, etc.). The amount of energy produced by cure enhancer(s) 22 and absorbed by the matrix may be sufficient to at least partially cure an exposed surface of the matrix before structure 12 axially grows more than a predetermined length away from head 20. In one embodiment, structure 12 is completely cured before the axial growth length becomes equal to an external diameter of the matrix-coated reinforcement.

In the embodiment of FIG. 1, head 20 is modular. For example, head 20 may include a matrix reservoir 26 and an outlet 24 that is removably connected to matrix reservoir 26 (e.g., via one or more threaded fasteners, clasps, actuators, and/or other hardware—not shown). In this example, outlet 24 is a single-track outlet configured to discharge composite material having a generally circular, rectangular, triangular, and/or other polygonal cross-section. The configuration of head 20, however, may allow outlet 24 to be swapped out for another outlet that discharges composite material having a different shape (e.g., a tubular cross-section, a ribbon or sheet cross-section, etc.) and/or a different number of tracks. It is also contemplated that head 20 may itself be selectively swapped out for a differently configured head, if desired.

In some embodiments, cure enhancer(s) 22 may be mounted to a lower portion (e.g., a portion distal from matrix reservoir 26) of outlet 24. With this configuration, cure enhancer(s) 22 may be located around a distal end in a configuration that best suits the shape, size, and/or type of material discharging from outlet 24. In the disclosed embodiment, cure enhancer(s) 22 are mounted at an angle relative to a central axis of outlet 24, such that energy from cure enhancer(s) 22 is directed centrally toward the material discharging from outlet 24. One or more optics 31 may be used in some applications, to selectively block, disperse, focus, and/or aim the energy from cure enhancer(s) 22 at or adjacent an opening of outlet 24. This may affect a cure rate of and/or cure location on the material discharging from outlet 24. It is contemplated that optics 31 may be adjustable, if desired (e.g., manually adjustable via a set screw—not shown, or automatically adjustable via an actuator—not shown).

The matrix and/or reinforcement may be discharged together from head 20 via any number of different modes of operation. In a first example mode of operation, the matrix and/or reinforcement are extruded (e.g., pushed under pressure and/or mechanical force) from head 20, as head 20 is moved by support 18 to create features of structure 12. In a second example mode of operation, at least the reinforcement is pulled from head 20, such that a tensile stress is created in the reinforcement during discharge. In this second mode of operation, the matrix may cling to the reinforcement and thereby also be pulled from head 20 along with the reinforcement, and/or the matrix may be discharged from head 20 under pressure along with the pulled reinforcement. In the second mode of operation, where the reinforcement is being pulled from head 20, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 20 as a result of head 20 being moved and/or tilted by support 18 away from an anchor point 32 (e.g., a print bed, an existing surface of structure 12, a fixture, etc.). For example, at the start of structure formation, a length of matrix-impregnated reinforcement may be pulled and/or pushed from head 20, deposited against anchor point 32, and at least partially cured, such that the discharged material adheres (or is otherwise coupled) to anchor point 32. Thereafter, head 20 may be moved and/or tilted away from anchor point 32, and the relative motion may cause the reinforcement to be pulled from head 20. As will be explained in more detail below, the movement of reinforcement through head 20 may be selectively assisted via one or more internal feed mechanisms, if desired. However, the discharge rate of reinforcement from head 20 may primarily be the result of relative movement between head 20 and anchor point 32, such that tension is created within the reinforcement. As discussed above, anchor point 32 could be moved away from head 20 instead of or in addition to head 20 being moved away from anchor point 32.

Any number of separate computing devices 16 may be used to design and/or control placement of the composite material within structure 12 and/or to analyze performance characteristics of structure 12 before, during, and/or after formation. Computing device 16 may include, among other things, a display 34, one or more processors 36, any number of input/output ("I/O") devices 38, any number of peripherals 40, and one or more memories 42 for storing programs 44 and data 46. Programs 44 may include, for example, any number of design and/or printing apps 48 and an operating system 50.

Display 34 of computing device 16 may include a liquid crystal display (LCD), a light emitting diode (LED) screen, an organic light emitting diode (OLED) screen, and/or another known display device. Display 34 may be used for presentation of data under the control of processor 36.

Processor 36 may be a single or multi-core processor configured with virtual processing technologies and use logic to simultaneously execute and control any number of operations. Processor 36 may be configured to implement virtual machine or other known technologies to execute, control, run, manipulate, and store any number of software modules, applications, programs, etc. In addition, in some embodiments, processor 36 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 42 can be a volatile or non-volatile, magnetic, semiconductor, tape, optical, removable, non-removable, or other type of storage device or tangible and/or non-transitory computer-readable medium that stores one or more executable programs 44, such as analysis and/or printing apps 48 and operating system 50. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, an EPROM, a FLASH-EPROM or other flash memory, NVRAM, a cache, a register or other memory chip or cartridge, and networked versions of the same.

Memory 42 may store instructions that enable processor 36 to execute one or more applications, such as design and/or fabrication apps 48, operating system 50, and any other type of application or software known to be available on computer systems. Alternatively or additionally, the instructions, application programs, etc. can be stored in an internal and/or external database (e.g., a cloud storage system—not shown) that is in direct communication with computing device 16, such as one or more databases or memories accessible via one or more networks (not shown). Memory 42 can include one or more memory devices that store data and instructions used to perform one or more features of the disclosed embodiments. Memory 42 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

In some embodiments, computing device 16 is communicatively connected to one or more remote memory devices (e.g., remote databases—not shown) through a network (not shown). The remote memory devices can be configured to store information that computing device 16 can access and/or manage. By way of example, the remote memory devices could be document management systems, Microsoft SQL database, SharePoint databases, Oracle databases, Sybase databases, Cassandra, HBase, or other relational or non-relational databases or regular files. Systems and methods consistent with disclosed embodiments, however, are not limited to separate databases or even to the use of a database.

Programs 44 may include one or more software or firmware modules causing processor 36 to perform one or more functions of the disclosed embodiments. Moreover, processor 36 can execute one or more programs located remotely from computing device 16. For example, computing device 16 can access one or more remote programs that, when executed, perform functions related to disclosed embodiments. In some embodiments, program(s) 44 stored in memory 42 and executed by processor 36 can include one or more of design, fabrication, and/or analysis apps 48 and operating system 50. Apps 48 may cause processor 36 to perform one or more functions of the disclosed methods.

Operating system 50 may perform known operating system functions when executed by one or more processors such as processor 36. By way of example, operating system 50 may include Microsoft Windows, Unix, Linux, OSX, IOS, Raspberry Pi OS (e.g., Rapbian), Android, or another type of operating system 50. Accordingly, disclosed embodiments can operate and function with computer systems running any type of operating system 50.

I/O devices 38 may include one or more interfaces for receiving signals or input from a user and/or machine 14, and for providing signals or output to machine 14 that allow structure 12 to be printed. For example, computing device 16 can include interface components for interfacing with one or more input devices, such as one or more keyboards, mouse devices, and the like, which enable computing device 16 to receive input from a user.

Figure 2:
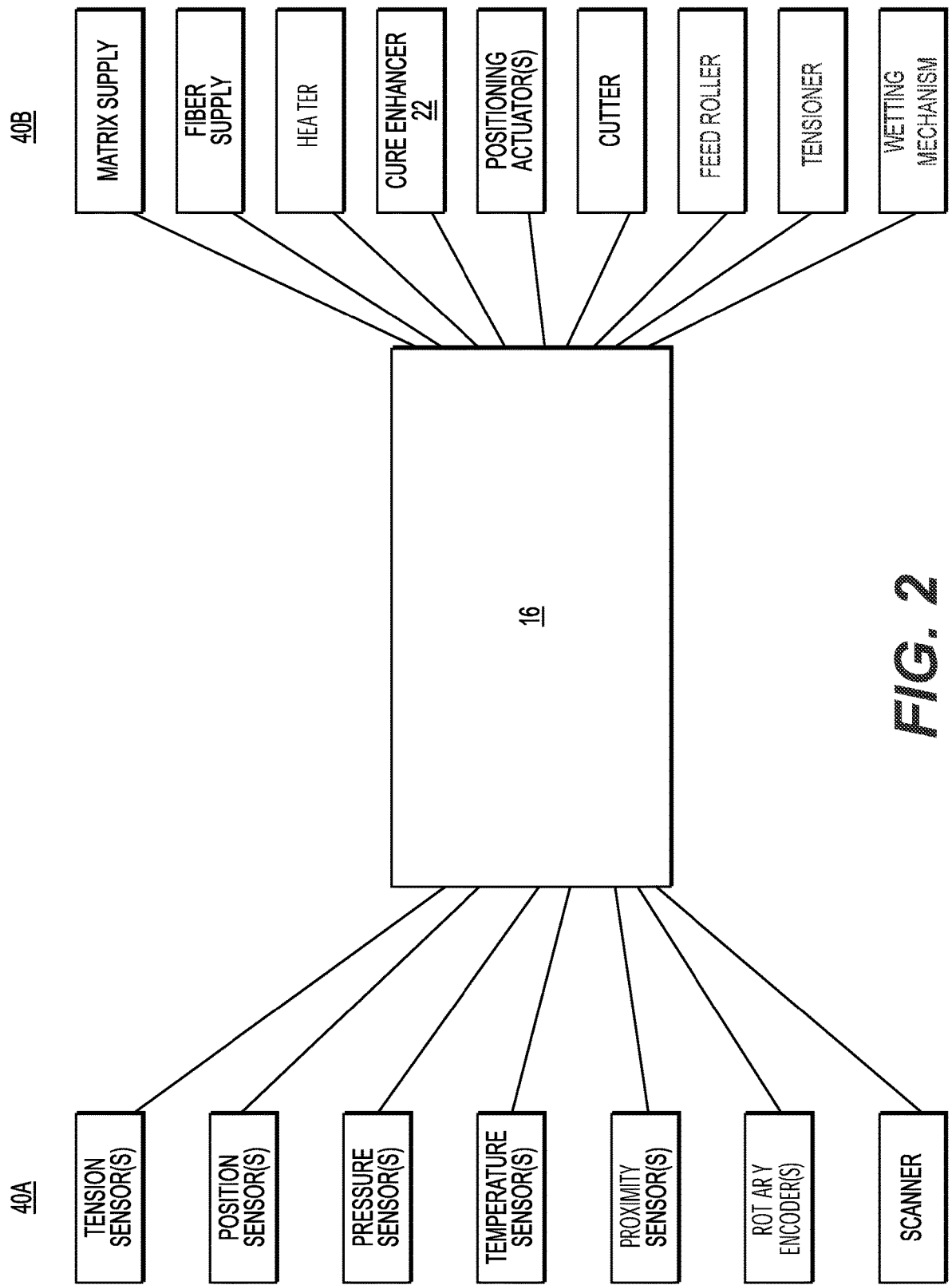
FIG. 2 is a schematic illustration of a portion of the system of FIG. 1.

Peripheral device(s) 40 may be standalone devices or devices that are embedded within or otherwise associated with machine 14 and used during fabrication of structure 12. As shown in FIG. 2, peripherals 40 can embody input devices (e.g., one or more sensors, such as tension sensors, position sensors, pressure sensors, temperature sensors, proximity sensors, level sensors, rotary encoders, scanners, potentiometers, and other sensors known in the art) 40A and/or output devices (e.g., one or more actuators, such as a matrix supply, a reinforcement (e.g., fiber) supply, a heater, a pump, cure enhancer 22, a positioning motor, a cutter, a feed roller, a tensioner, a wetting mechanism, a compactor, etc.) 40B. In some embodiments, peripheral device(s) 40 may, themselves, include one or more processors (e.g., a programmable logic control (PLC), a computer numeric controller (CNC), etc.), a memory, and/or a transceiver. When peripheral device(s) 40 are equipped with a dedicated processor and memory, the dedicated processor may be configured to execute instructions stored on the memory to receive commands from processor 36 associated with video, audio, other sensory data, control data, location data, etc., including capture commands, processing commands, motion commands, and/or transmission commands. The transceiver may include a wired or wireless communication device capable of transmitting data to or from one or more other components in system 10. In some embodiments, the transceiver can receive data from processor 36, including instructions for sensor and/or actuator activation and for the transmission of data via the transceiver. In response to the received instructions, the transceiver can packetize and transmit data between processor 36 and the other components.

Design, fabrication, and/or analysis apps 48 may cause computing device 16 to perform methods related to generating, receiving, processing, analyzing, storing, and/or transmitting data in association with operation of machine 14 and corresponding design/fabrication/analysis of structure 12. For example, apps 48 may be able to configure computing device 16 to perform operations including: displaying a graphical user interface (GUI) on display 34 for receiving design/control instructions and information from the operator of machine 14; capturing sensory data associated with machine 14 (e.g., via peripherals 40A); receiving instructions via I/O devices 38 and/or the user interface regarding specifications, desired characteristics, and/or desired performance of structure 12; processing the control instructions; generating one or more possible designs of and/or plans for fabricating structure 12; analyzing and/or optimizing the designs and/or plans; providing recommendations of one or more designs and/or plans; controlling machine 14 to fabricate a recommended and/or selected design via a recommended and/or selected plan; analyzing the fabrication; and/or providing feedback and adjustments to machine 14 for improving future fabrications.

Figure 3:
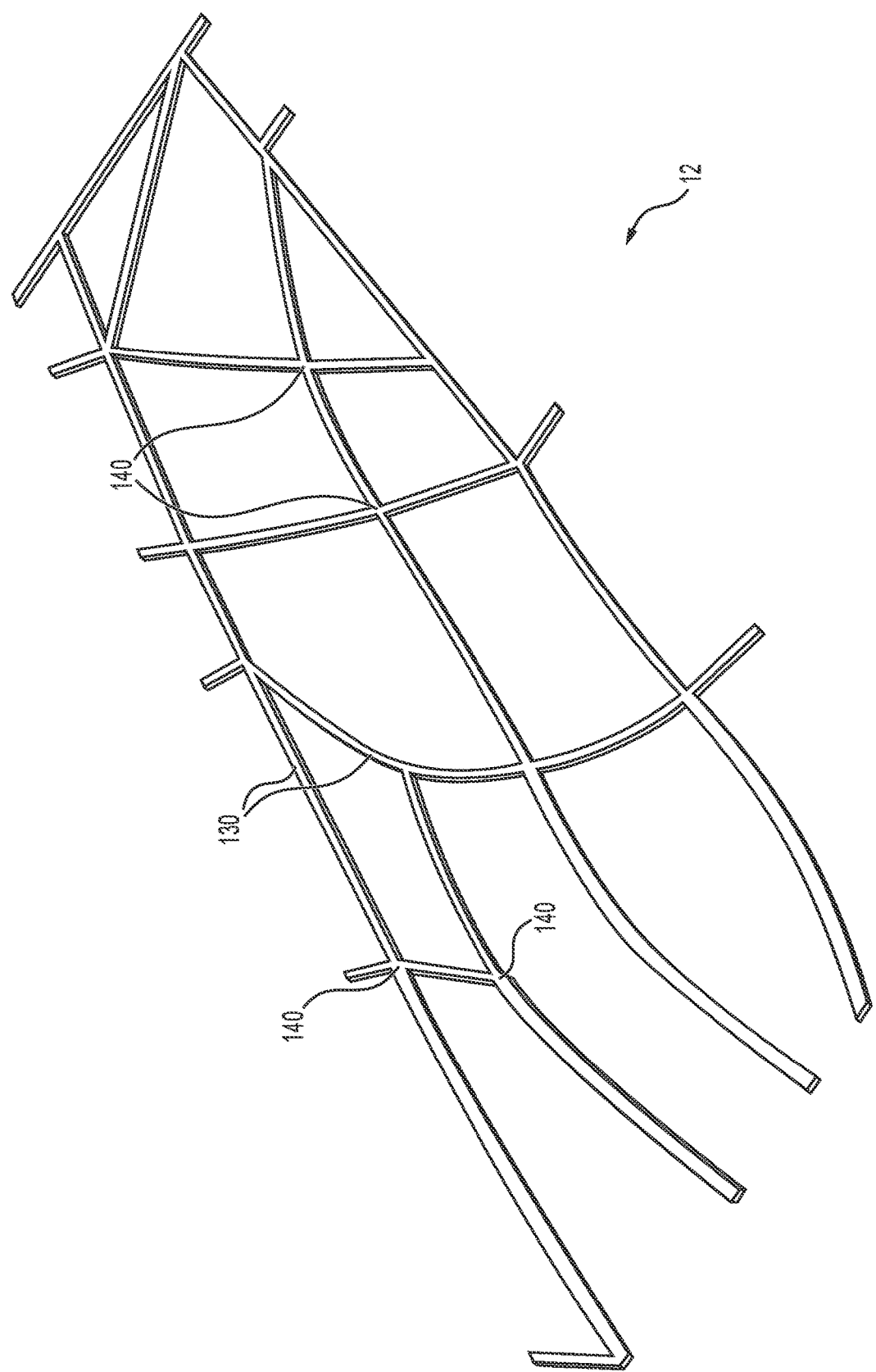
FIGS. 3 shows an example of a structure that may be manufactured using the system of FIGS. 1 and 2.

FIG. 3 shows a further example of a structure 12 that may be fabricated using system 10 of FIG. 1, or other such similar systems. At least some of structure 12 in this example is manufactured using the matrix M and continuous reinforcement R, which are together considered the composite material described above.

Structure 12 of FIG. 3 is configured to provide mechanical support. In the depicted example, structure 12 provides mechanical support for a section of an aircraft. Particularly, structure 12 shown in FIG. 3 provides an interior support structure for an aircraft wing, or the like. As such, structure 12 comprises a number of support members 130 (e.g., struts, ribs, etc.). Typically, it may be that such support members 130 would otherwise be fabricated separately and thereafter secured together at one or more joints 140, for example by mechanical fasteners (e.g., bolts, rivets, screws, etc.). Support members 130 may abut, intersect, and/or overlap other support members 130 at joints 140. While acceptable for some applications, mechanical fasteners contribute to additional weight of structure 12 and/or increase the complexity of the overall design or manufacturing process (e.g., the steps of assembling and securing each of support members 130 may increase the manufacturing effort and complexity). Further, support members 130 that are mechanical secured also provide regions of undesirable stress risers in structure 12. Securing each of support members 130 after fabrication of those members also provides regions of potential fatigue and/or failure, which reduce lifespan and/or service/inspection intervals.

As will be described, structure 12 of FIG. 3 is fabricated without the need to secure some or all support members 130 using mechanical fasteners or indeed join those support members 130 together after fabrication. In this example, structure 12 is fabricated such that some or all joints 140 within structure 12 are manufactured during the deposition of composite material. That is, some or all of joints 140 may be formed integrally with the remainder of structure 12. Further, and as will be described, structure 12 may be fabricated such that the "bumps" mentioned above are avoided. At the same time, the resultant structure 12 maintains mechanical strength and/or toughness across joints 140 suitable for the intended use, and obviates issues associated with unwanted weight, failure mechanisms, and/or lifespan/maintenance.

During fabrication of structure 12, the composite material discharged by system 10 may be deposited into adjacent (e.g., overlapping) layers. Within each layer, the composite material is discharged into adjacent paths, wherein a thickness of an individual path is substantially identical to a thickness of the corresponding layer in which the path is deposited, at any given location within the layer. Each layer may have the same or different thickness. It should be noted that each layer making up structure 12 may be planar or non-planar and fully supported by an adjacent layer or extend partially into free-space, as desired. Generally, all paths within a given layer are discharged prior to fabrication of an adjacent layer, although this may not always be so.

Similarly, each layer may generally be compacted and at least partially cured prior to fabrication of an adjacent layer.

During fabrication of structure 12, joints 140 may be formed at regions where paths abut, intersect, overlap, touch, or otherwise join within a given layer during deposition. Similar joints 140 may be formed across multiple layers and, in some applications, the joints may be similarly located within each layer (e.g., joints 140 may align and/or overlap between layers). Each joint 140 may have a particular thickness within a given layer that is affected by the thickness(es) of the paths making up joint 140 and a configuration of joint 140 (e.g., if the paths abut or overlap). Similarly, joint 140 may also have a width (e.g., a dimension in a direction generally orthogonal to the thickness of the layer) that is affected by the width of each path making up joint 140 and a configuration of joint 140 (e.g., if the paths abut or overlap, and a spacing of such). Each path may have a particular width that is based at least in part on dimensions of the reinforcement, a thickness of the matrix coating the reinforcement, and a configuration of system 10 that discharges the path. In general, the width and thickness of each path fabricated via the same system 10 will have relatively constant values. Each path may be continuous or comprise one or more discontinuities (e.g., at joint 140). These discontinuities may be formed, for example, when a path is cut by machine 14 at the end of deposition of the given path.

As can be seen in the wing structure example of FIG. 3, some members 130 may be thicker and/or wider than others. This may occur, for example, when one path splits into two at joint 140, or vice versa. This splitting and/or joining may occur at joints 140 having different configurations. For example, joint 140 may have two or more branches fabricated from any number of different paths that lie adjacent each other within the same layer and/or lie on top of each other and are built up through multiple layers. The branches may be planar or nonplanar and orthogonal to each other or angled obliquely. The paths may be straight, curved, or stepped. It should be noted that paths need not split into multiple branches or converge into fewer branches at a joint. That is, joint 140 may also be a location where paths simply touch and are bonded to each other for a distance and/or cross-over each other or themselves.

Figure 4:
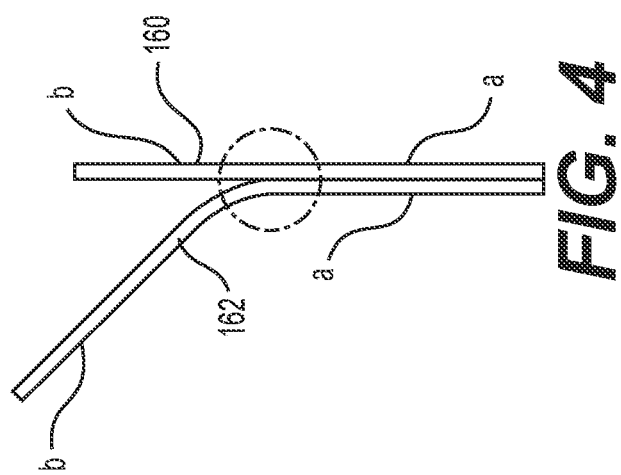

Consider now FIG. 4, which show an example joint 140. For ease of understanding, joint 140 is shown as being planar (i.e., having all associated paths lying within the same plane), but that need not always be the case here or indeed in other examples of joints described below. In FIG. 4, joint 140 can be considered a three-way branch. That is, joint 140 may include a first path 160 and a second path 162 of composite material deposited within the same layer during the fabrication process, where the paths come together or split apart at joint 140 (depending on perspective). Paths 160, 162, in this example, may each include two portions (e.g., an a-portion and a b-potion) extending outward from a central location (represented by the dashed circle) of joint 140. The two portions are integrally connected to each other via a middle portion located at a center (represented by a dashed circle) of joint 140. It should be noted that the extending portions of a given path may be straight or curved and extend outward in direct and parallel opposition to each other or at other angles.

In the example shown in FIG. 4, the a- and b-portions of path 160 extend outward from joint 140 in direct and parallel opposition to each other. In contrast, the extending portions a- and b-portions of path 162 extend outward from joint 140 at an angle (e.g., an oblique angle) relative to each other. The angular-extending nature of these portions of path 162 results in the a-portions of each path 160, 162 being deposited adjacent (e.g., parallel and touching) to each other to form a wider branch, and the corresponding b-portions diverging from each other to form separate narrower branches. It will be appreciated that the a-portions may be bonded or otherwise adhered to each other during curing of the matrix coating the reinforcements within each of the respective paths 160, 162. In this example, paths 160, 162 may be deposited in any order.

Joint 140 may be useful in accommodating an asymmetric (e.g., three-way) intersection of paths 160, 162 having unequal angles between the branches. However, it is contemplated that joint 140 may be symmetric and have equal angles (see FIG. 5, for example) between some or all of the branches, if desired.

Multiple benefits may be associated with joint 140. For example, joint 140 can be fabricated without needing to cut any of the reinforcements within the paths, which may enhance a strength/toughness of structure 12 and/or reduce a time required for fabrication. Because one or more of paths 160, 162 pass in a straight-line trajectory through joint 140, a strength of joint 140 may be enhanced (e.g., in a direction aligned with the trajectory).

The branches of joint 140 may have equal or unequal widths within the plane. For example, joint 140 of FIGS. 4 has a first branch (e.g., the lower branch including both portions a) that is twice as thick as each of the remaining two branches (e.g., upper-left and upper-right branches each separately including a single portion b). It will be readily appreciated that additional complementary paths may be provided at joint 140 to increase the widths of any of the branches, without increasing a thickness of the layer. The thickness of joint 140 may be the same as the thickness of each of the individual paths, branches, and rest of the layer in which joint 140 resides.

Figure 5:
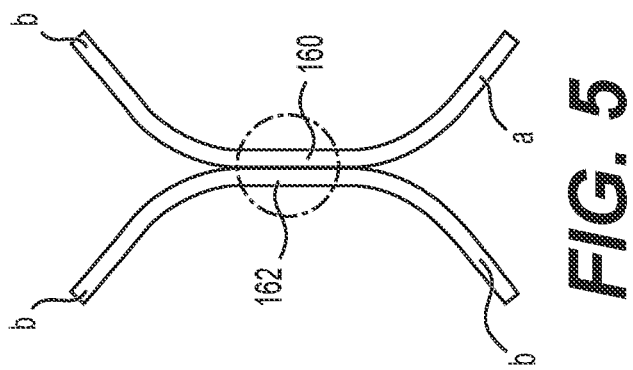

Joint 140 illustrated in FIG. 5 may be considered to have four branches, wherein each of paths 160, 162 are divergent from each other at both opposing ends (e.g., at the a-portions and the b-portions). As discussed above, joint 140 of this example is symmetric (e.g., in two orthogonal directions within the plane of the layer). It is contemplated that one of paths 160, 162 could alternatively pass through joint 140 in straight-line fashion and still maintain dual divergency, if desired. In both examples of Figs, 4 and 5, the paths are bonded to each other at the centers of joint 140 to form a butt joint, without crossing over each other and increasing the thickness of joint 140.

Figure 6:
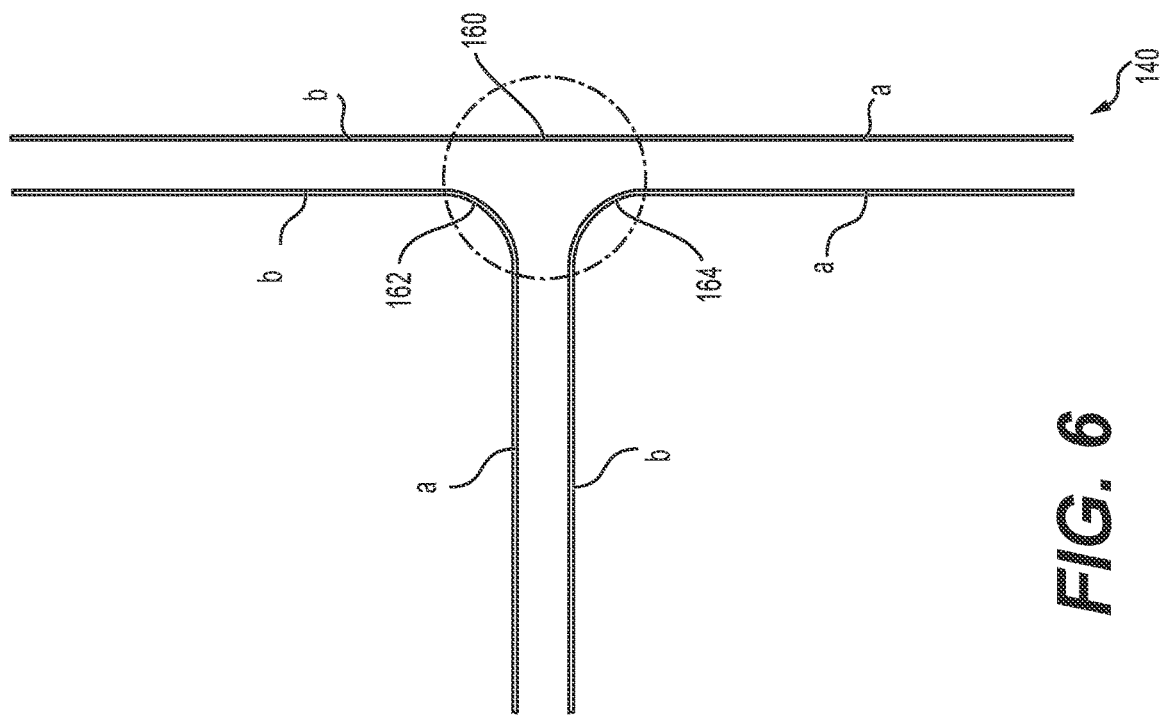

FIG. 6 shows a further example of joint 140. In this alternative example, joint 140 of FIG. 6 is a three-way intersection, similar to joint 140 of FIG. 4. However, in contrast to joint 140 of FIG. 4, joint 140 of FIG. 6 comprises three separate paths 160, 162, and 164 instead of only two paths. All three paths 160, 162, and 164 may be deposited within the same layer having a common thickness. The first two paths 160, 162, like in the embodiment of FIG. 4, each have a b-portion extending from the center of joint 140 that are adjacent, parallel, and bonded to each other, and an a-portion extending from the center that are divergent. In mirrored fashion, the first and third paths 160, 164 each have an a-portion that are adjacent, parallel and bonded to each other, and a b-portion that diverge from each other. The a-portion of path 162 and the b-portion of path 164 may be adjacent, parallel and bonded to each other. Only path 160 may pass through joint 140 along a straight-line trajectory, thereby increasing a strength of joint 140 in this direction. It is contemplated, however, that all of the paths illustrated in FIG. 6 may bend through an angle (i.e., that none are straight), if desired.

Joint 140 of FIGS. 6 is shown as having three branches of equal widths and arranged in the shape of a T. In order to form this shape, two adjacent angles between the branches may be about 90°, while the remaining angle between branches may be about 180°. While the illustrated example shows joint 140 as being symmetric in one direction within the plane, it is contemplated that other variations may be possible. For example, the interior angles between the branches could all be equal or all unequal. When all of the angles are equal, joint 140 may have a strength that is equal along each of the branches.

Figure 7:
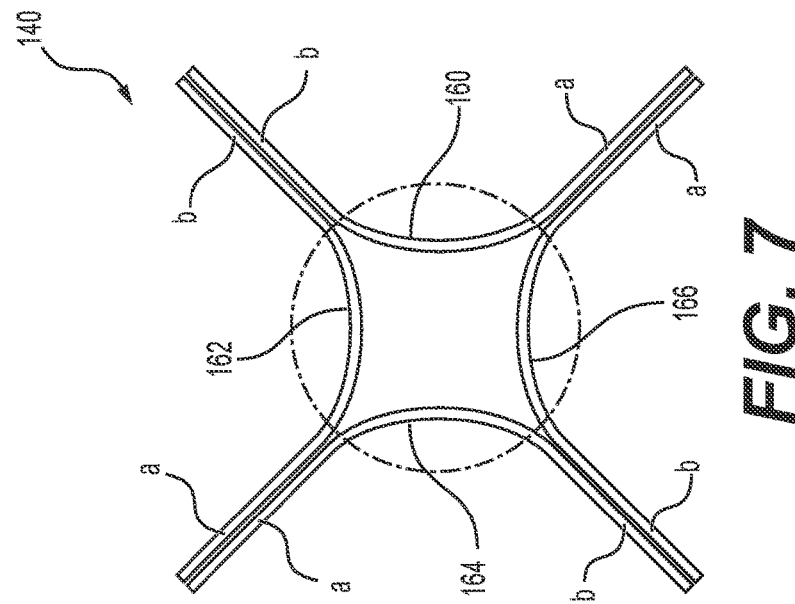

FIG. 7 shows a further example of joint 140 that may be used use when fabricating structure 12 of FIG. 3. Here, in addition to first, second and third paths 160-164, a fourth path 166 of composite material may be deposited. Each of paths 160-166 may comprise a-portions that bend away from (i.e., do not lie on a straight axial trajectory with) b-potion of the same path. As such, the a-portions of two adjacent paths (e.g., paths 160, 166; or 162, 164) may be deposited adjacent and parallel to each other, while the b-portions of two adjacent paths (e.g., a different combination of two paths 160, 162; or 164, 166) may be bonded adjacent and parallel to each other. In no situation, is there more than one portion (i.e., a-portion or b-portion) of the same two adjacent paths bonded to each other, and each path is bonded to two different paths.

In each of the examples shown in FIGS. 6 and 7, an aperture may be formed within the center of the joint (e.g., between reinforcements within the paths). It is contemplated that the aperture may be left empty or filled with matrix, as desired. Regardless of being filled or left empty, a density of the paths (e.g., an amount of reinforcement for a given volume) at the center of the joint may be lower than within the same paths at locations away from the center (e.g., within branches of the joint). It will be appreciated that the adhered portions of joint 140 (e.g., the branches) shown in each of FIGS. 6 and 7 may have an effective width within the layer that is greater than (in this case twice that of) the widths of the individual paths located around the aperture. As such, a relative stiffness of the composite material surrounding the aperture may be considered to be less than that of the branches. Such joints 140 may therefore provide a region of flex, or flex relative to the remainder of the adhered structure 12. Such flex may improve the overall toughness of structure 12 and an ability to yield elastically to certain loading conditions without damaging structure 12.

Joint 140 of FIG. 7 may exhibit symmetry in four directions. For example, two branches extend opposite each other along common axes.

Figure 12:
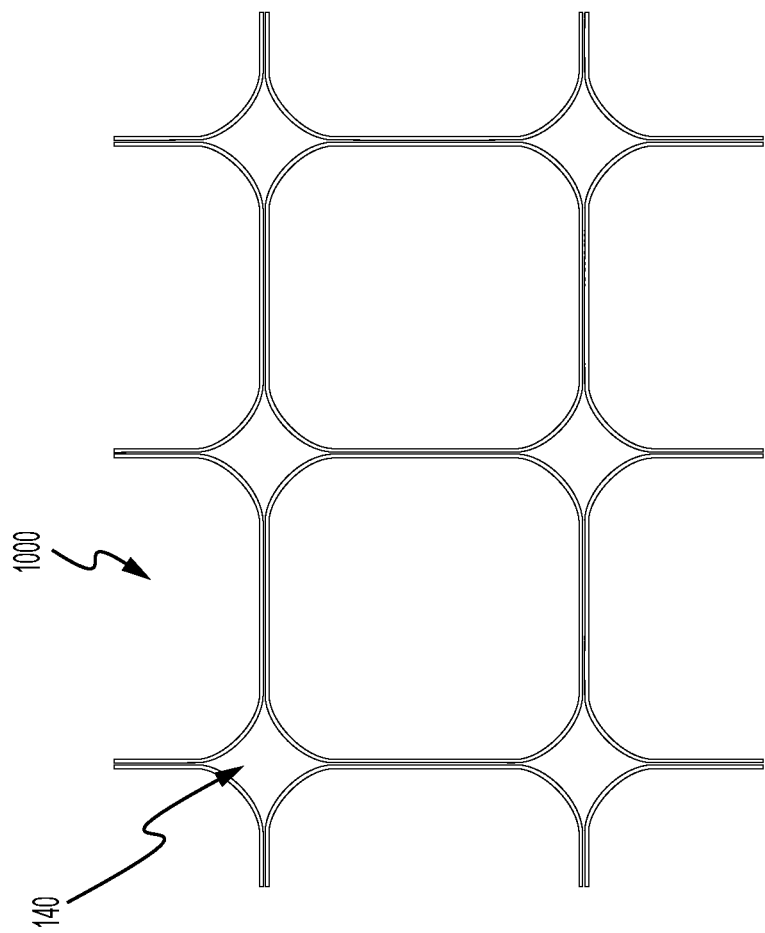
FIGS. 12 and 13 are diagrammatic examples of infill patterns that may be provided using one or more of the joints of FIGS. 4-11C.

The aperture within the center of joint 140 may provide a suitable attachment feature for further structures (e.g., further features associated with an aircraft structure, such as a wing or fuselage). Additionally or alternatively, the aperture may form part of a conduit through overlapping layers of structure 12 that passes fluids (air, hydraulic oil, coolant, etc.), lines (e.g., power lines, communication lines, heating cables, etc.), and/or other materials or components. Further, the aperture (or formed conduit) may be filled (fully or partially with materials affecting acoustic transmission, rigidity, mechanical dampening, or the like) during or after the manufacturing process to augment mechanical properties of structure 12. In some examples, joint 140 of FIG. 7 may be used as the basis for an infill pattern 1000 (see FIG. 12).

While in the above descriptions of FIGS. 6 and 7, three and four paths, respectively, have been disclosed, it will be appreciated that this is by example only. In some further examples, more than four paths may be provided, such that respective portions of each of the additional paths of continuous reinforcement are adjacent and adhered to corresponding divergent portions of the other paths of reinforcement so as to form any number of branches of joint 140. In these further examples, an aperture may be defined by the plurality of paths making up the branches. It will be appreciated that the number of paths provided, and the resultant joint 140, may be provided based on desired mechanical characteristics of structure 12.

Figure 8:
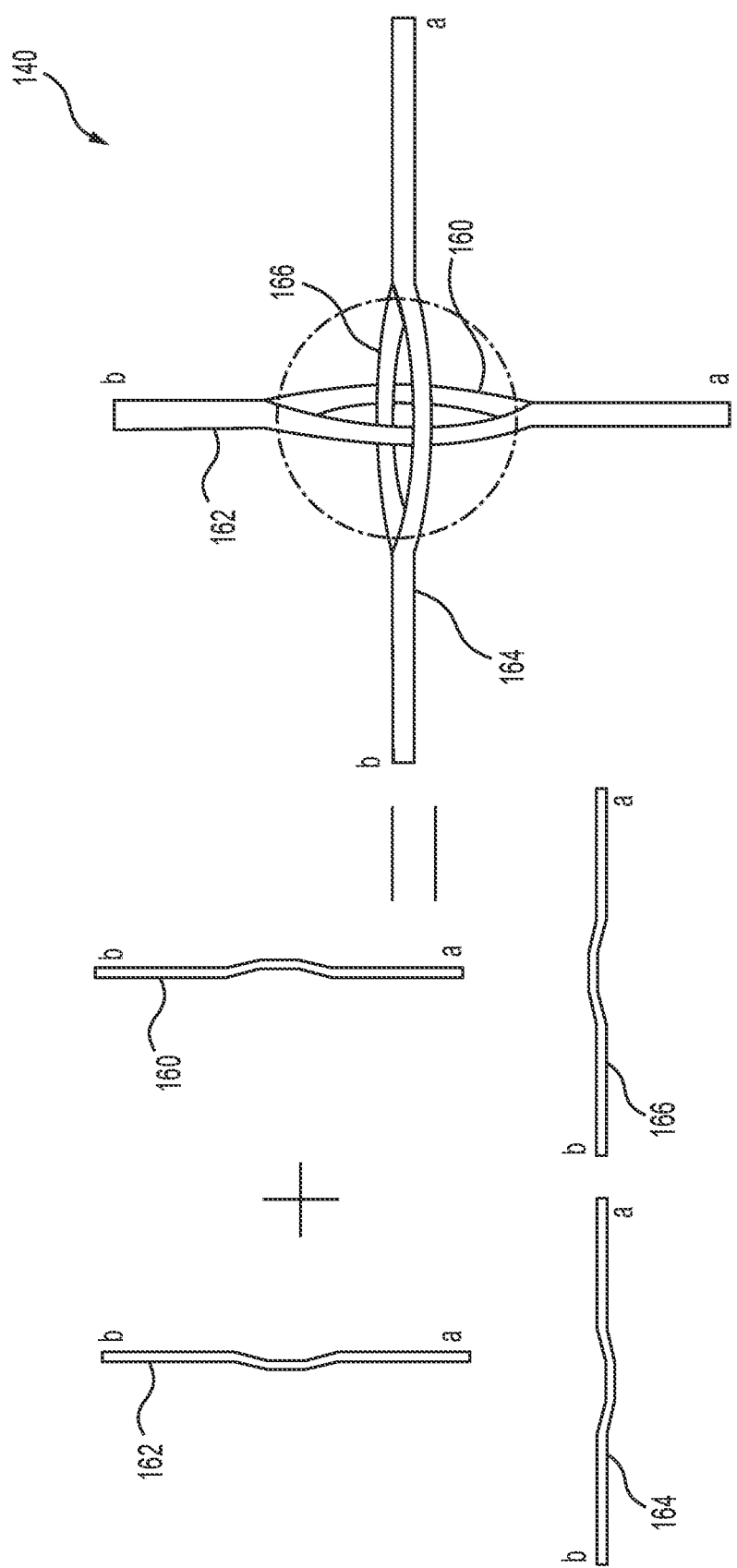

FIG. 8 shows a further example of joint 140 that may be used when manufacturing the exemplary structure 12 of FIG. 3. In contrast to the previous examples of joint 140, joint 140 of FIG. 8 illustrates crossing over of paths 160-166 in a manner designed to limit an accumulating buildup or "bump". With this design, joint 140 may build up at a same general rate as a rate at which pairs of layers within structure 12 are being deposited. For example, as paths 160-166 are deposited at joint 140, "bumps" having a thickness twice that of the individual layer occur within every layer. However, as will be explained below in more detail, the bumps alternate locations between adjacent layers, such that for every two adjacent layers having a combined thickness of 2 t, any one bump at joint 140 also has a thickness of only 2 t.

FIG. 8 shows trajectories of paths 160-166 that may be deposited in a unique pattern to form joint 140 between two adjacent layers. For example, each of paths 160 and 162 may be deposited substantially along a first (e.g., vertical) trajectory (e.g., a straight-line axis or curving trajectory) in overlapping manner (e.g., a-portions may overlap each other, and b-portions may overlap each other), but deviate in opposing second (e.g., horizontal) directions at the center of joint 140 (paths 160 and 162 may not overlap at the center of joint 140). Similarly, each of paths 164 and 166 may be deposited substantially along a second (e.g., horizontal) trajectory in overlapping manner, but deviate in opposing vertical directions at the center of joint 140. It should be noted that, while these axes are shown and described as being orthogonal to each other (i.e., vertical and horizontal), they may be oriented at the center of joint 140 to have any desired angle.

The order of deposition may include path 160 and then path 166 within a first layer of structure 12, followed by path 162 and then path 164 within the overlapping second layer of structure 12. As a result of the trajectories of paths 160-166 and the above-described deposition order, each individual path may intersect (e.g., cross-over or cross-under) two other paths at two different locations of joint 140 for every two layers of structure 12 that are deposited. A "bump" may be formed at each of these intersections and have a thickness of 2 t (e.g., a thickness that is twice a thickness of any one of the paths and the same thickness of the two overlapping layers at locations outside of joint 140). Accordingly, four "bumps" may be formed at a 4-way joint made from four different paths. It is contemplated that the locations of these four bumps may be repeated for every pairing of two layers within structure 12 and that the aperture described above may be formed at a general center between these bumps.

It will be appreciated that providing four paths in the above-described manner, each of which is deviated around the aperture, may result in mechanical symmetry of joint 140 in multiple (e.g., 2, 3, 4 or more) directions. However, in other examples, certain paths need not be deviated around a center point of joint 140 and, in these examples, the mechanical symmetry may be reduced. For example, one or more of the paths may be deposited in a straight-line trajectory through the center point (e.g., along and parallel to the vertical or horizontal trajectories, without deviation). In such examples, the aperture may not be formed or only partially formed. For example, one of paths 160, 162 and/or one of paths 164, 166 may extend through the center point, while the other of the paired paths may deviate in the manner described above. And the one path of each pairing passing straight through the center point or deviating may alternate during each pass through joint 140, if desired. As mentioned above, providing one or more paths that extend straight through joint 140 may increase the strength/toughness of joint 140 and/or the loading that may be applied through joint 140. In some examples, the extent to which layers comprise paths that extend through or deviate from the center point of joint 140 may be selected based on desired mechanical properties of structure 12.

It is further contemplated that a direction of deviation at the center of joint 140 may vary, in some applications. In one example, overlapping paths lying along a single axis may deviate in opposing directions at the center of joint 140. However, in another example, the overlapping paths may deviate in the same direction, but by differing amounts such that the paths still do not overlap at the center of joint 140. In addition, while some example embodiments deviate by amounts sufficient to form the aperture at the center point of joint 140, it is contemplated that the deviation may be enough only to inhibit overlap in the center of joint 140 (i.e., without creating the aperture).

Figure 9:
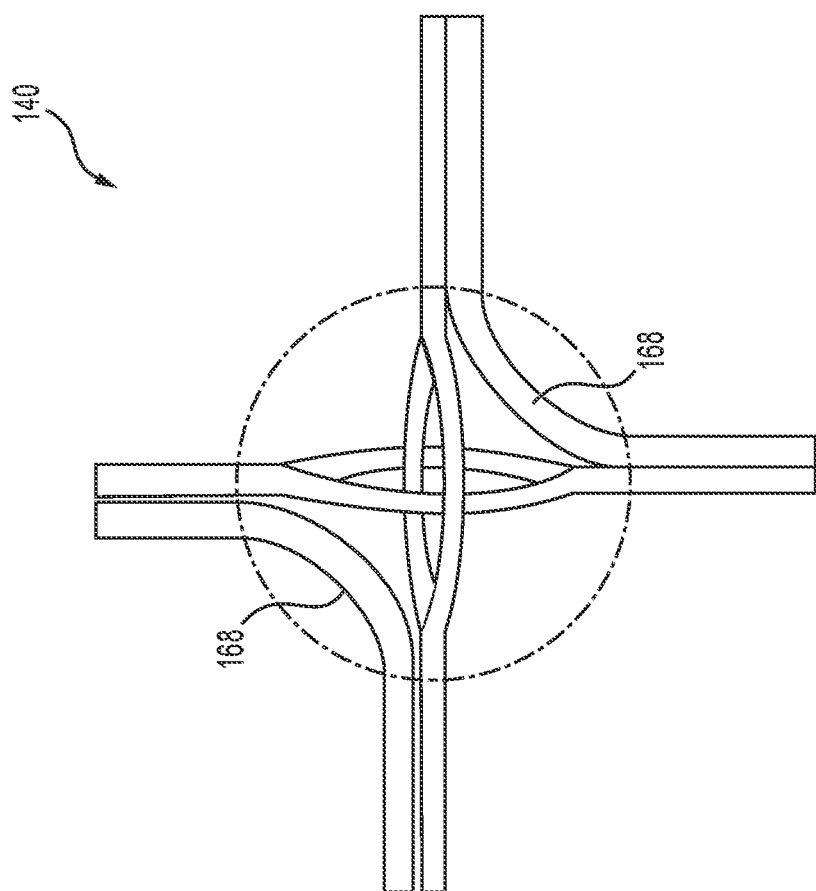

It will further be appreciated that the example joint 140 of FIG. 8 (whether or not some or all paths deviate around a center point) may additionally be augmented using an approach similar to that described with respect to FIG. 6 or 7. For example, FIG. 9 illustrates an example of joint 140 wherein one or more additional paths 168 have been added between adjacent branches to increase a rigidity of the joint. In this particular example, two paths have been added at opposing corners (e.g., at diagonal locations across the joint, relative to the above-described axes) of joint 140. It should be noted that any number (e.g., 1, 3, or 4) paths could have alternatively been added in similar manner, the number and/or related symmetry/asymmetry of the resultant joint affecting a strength and/or flexibility of the joint. These added paths may function as fillets and connect the adjacent branches of joint 140, without passing through the center of the joint. It should be noted that a distance that the added path(s) extend into the associated corner between branches may affect a size and strength of joint 140. For example, a greater extension may reduce a size and/or void content of joint 140, whereas a lesser extension may increase a rigidity of joint 140. The added path(s) may be parallel to, touching and/or adhered to the a/b-portions of the original paths up until original paths deviate from their straight-line trajectories.

Figure 21:
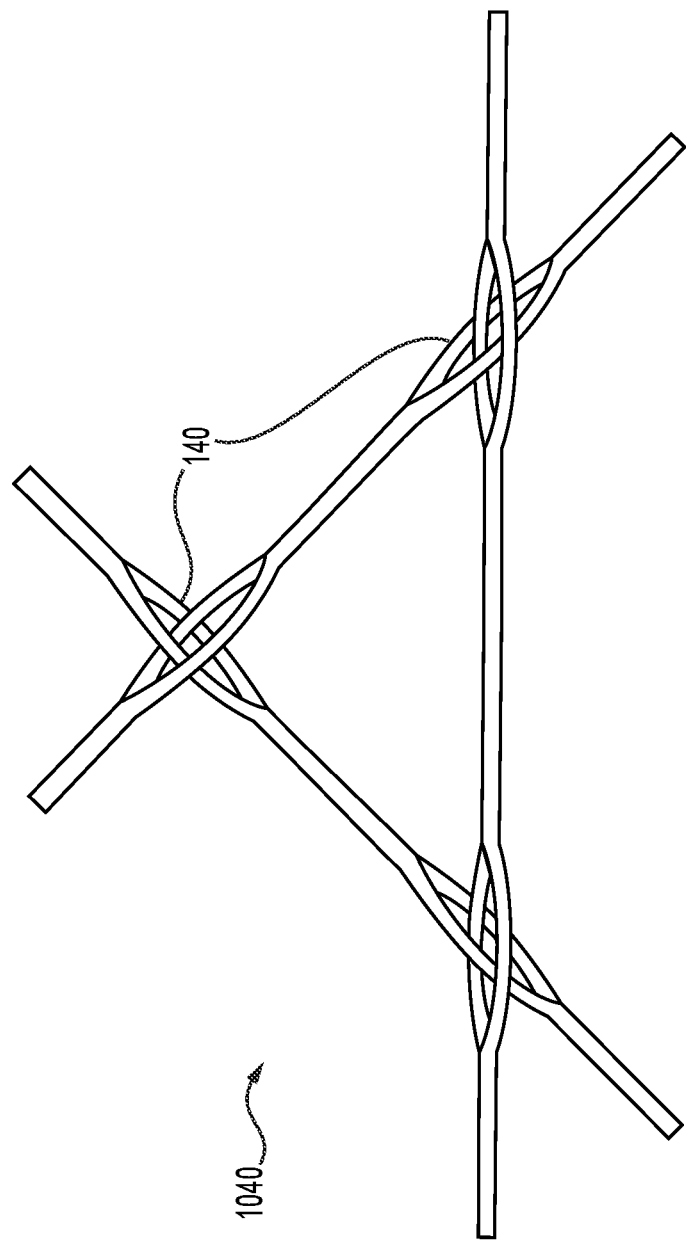
FIG. 21 is a final diagrammatic example of an additional infill pattern.

As described above, the joints 140 of FIGS. 8 and 9 may generally be fabricated via deposition of multiple (e.g., paired) layers within structure 12. Accordingly, the additional fillet-like paths of FIG. 9 may be added in any combination of one or both of the layers. For example, all of the fillet-paths could be added within only the first layer, within only the second layer, within both the first and second layers (e.g., in overlapping manner), or in some combination of the first and second layers. In some examples, joint 140 of FIG. 9 may be used as the basis for an infill pattern 1040 (see FIG. 21), with or without fillet paths 168.

FIG. 10 shows a further example of joint 140 similar to that of FIG. 8. In this example, the a- and b-portions of each of the respective paths 160-166 are deposited along intersecting trajectories, with the centers of each path deviating around a center point of joint 140 to form the above-described aperture. However, in contrast to a simple (e.g., linear) deviation of some step at the center point, each path may deviate in an arcuate manner. In the disclosed example, each path forms a semi-circle (e.g., a 180° arc having a constant radius), such that two adjacent paths (e.g., the paths that overlap at the a- and b-portions along the same axis) together form a complete or near-complete circle. In this same example, fillet path 168 may selectively be utilized to connect any number of adjacent branches of joint 140 (e.g., within every layer, every-other layer, or only select layers), if desired. It is also contemplated that, rather than path(s) 168 being "add-on" paths adhered transversely outward to the other paths 160-166, path(s) 168 could instead be used in place of or in-between paths 160-168, if desired. For example, at interleaving layer(s), any number of (e.g., two or four) paths 168 could be used to form partial or complete circles around the aperture and overlap completely or nearly completely with paths 160-168 of underlying layers.

Figure 13:
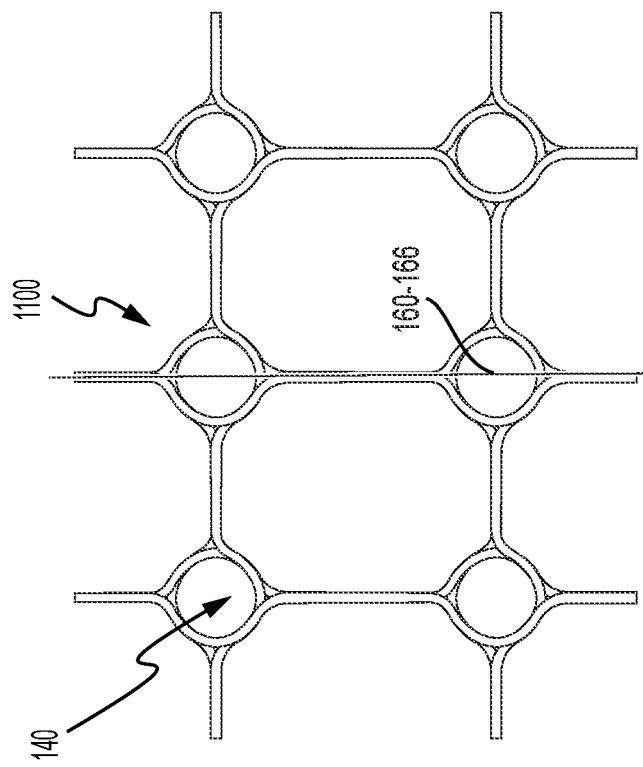

Joint 140 illustrated in FIG. 10 may be used to form an infill pattern 1100, as shown in FIG. 13. As will be appreciated, apertures may be formed inside of each of these joints 140, as well as between adjacent joints 140 (which additionally or alternatively may be used as conduits, filled with material, etc., as above). As mentioned above, one or more of paths 160-166, instead of deviating around the center aperture, may instead extend in a straight-line manner across one or more joint 140 s, in one or more of the layers. In doing so, particular mechanical properties (e.g., stiffness, strength, etc.) may be enhanced in one or more directions.

Figure 20:
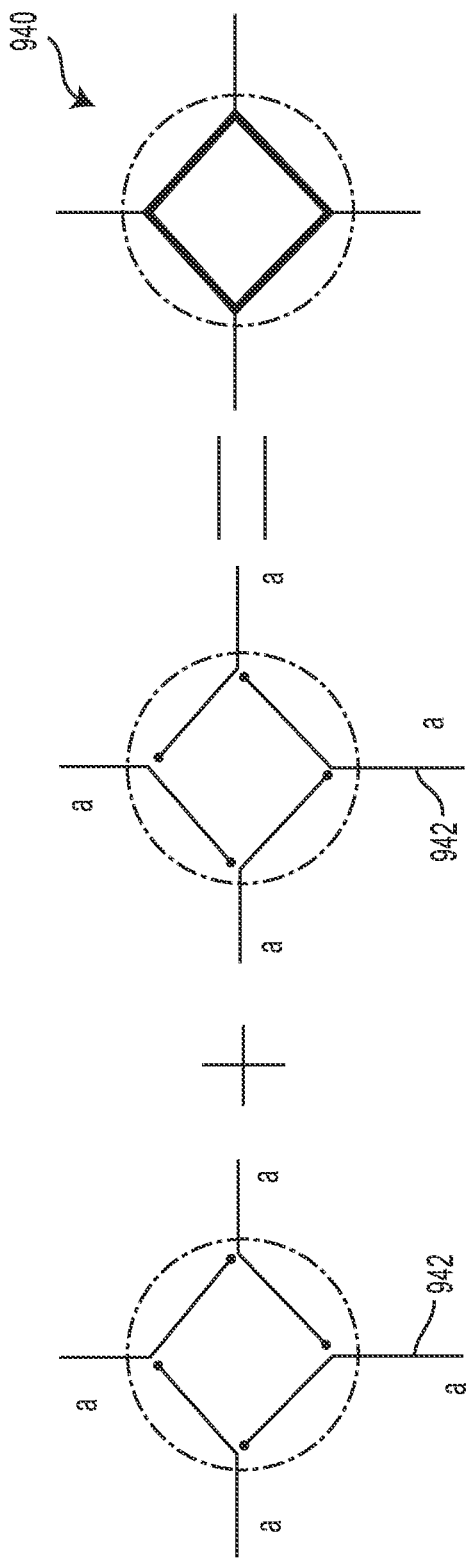

It is contemplated that joint 140 illustrated in FIG. 10 could be fabricated without some or all of the arcuate segments, if desired. For example, one or more paths 164 could be fabricated as a series of straight-line segments (e.g., four segments). In this configuration, rather than forming a central circle or cylinder within joint 140, a central diamond could instead be formed (like what is shown in FIG. 20). Similarly, path 168 could instead or additionally be formed from a series of straight-line segments (e.g., three or four segments), if desired.

It is further contemplated that, instead of using paths that each have a ½-circle center portion, joint 140 could be formed via paths that each have a ¼-circle center portion and no b-portion. In this configuration, all fourth paths 160-164 may together make up a single layer of joint 140.

Figure 11A:
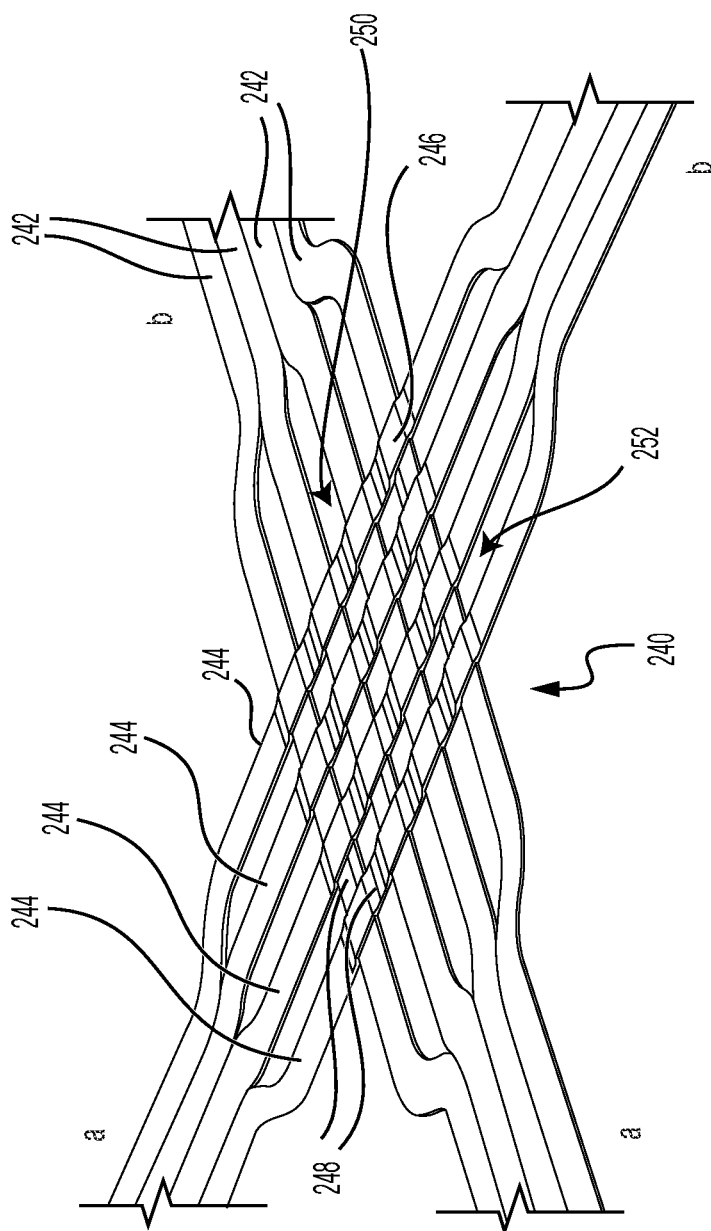

FIGS. 11A-11C show deposition steps of a further joint 240, which may be used in the fabrication of the structure 12. FIG. 11A shows a plurality (e.g., four) of first paths 242 deposited within a first layer of joint 240 and making up two (e.g., first and second opposing) branches of joint 240. Each of paths 242 may have generally consistent in-layer (i.e., width) and out-of-layer (i.e., thickness) dimensions. At the a- and b-portions, paths 242 may lie generally parallel and immediately adjacent to each other (e.g., without spacing therebetween) within the layer. Like joint 140 of FIG. 8, however, paths 242 of joint 240 may deviate within the layer outward away from a center of joint 240. In this embodiment, each of paths 242 may deviate outward by an amount required to produce a spacing between adjacent paths 242 at the center of joint 240. In one embodiment, a width of this spacing may be about equal to or greater than a width of the individual paths 242 bordering the spacing. Paths 242 and the spacings therebetween may be generally parallel with each other at the center of joint 240 and also parallel with the a- and b-portions of the same paths 242. Due to the spaced-apart nature of paths 242 at the center of joint 240, the corresponding branches may taper and converge outside of the center towards the a- and b-portions of paths 242. While this tapering is illustrated as being generally centered about an axial direction of the branches, it is contemplated that the tapering could be asymmetric (e.g., the deviation could occur in only one direction) if desired.

Additional (e.g., third and fourth opposing) branches of paths within joint 240 are illustrated in FIG. 11A as intersecting with the first and second branches. It should be noted that an angle of intersection between the two branches may orthogonal or oblique and otherwise suitable for a particular application. Like the first and second branches, the third and fourth branches may include a plurality of paths 244 deposited primarily within the first layer of joint 240. Each of paths 244 may have a generally consistent width and thickness and, at the a- and b-portions, lie generally parallel and immediately adjacent to each other within the first layer. Like paths 242, paths 244 may also deviate outward away from the center of joint 240 by an amount required to produce a spacing between adjacent paths 244 at the center of joint 240. The width of this spacing may be about equal to or greater than a width of the individual paths 244 bordering the spacing. Paths 244 and the spacings therebetween may be generally parallel with each other at the center of joint 240 and also parallel with the a- and b-portions of the same paths 244. Due to the spaced-apart nature of paths 244 at the center of joint 240, the corresponding branches may taper and converge outside of the center towards the a- and b-portions of paths 244. The tapering may be centered about an axial direction of the branch or asymmetric, as desired.

A plurality of bumps 246 may be formed at locations where paths 244 cross over paths 242. Each of these bumps 246 may consist of two layers of material, including underlying portions of paths 242 lying within the first layer of structure 12 and overlapping portions of paths 244 that extend into the second layer. Accordingly, each bump 246 may have a thickness equal to the combined thicknesses of paths 242 and 244. Assuming that each of the layers and paths 242, 244 have an equal thickness "t", each bump 246 may have a thickness of "2 t".

A depression 248 may be created at each location between adjacent bumps 246 along a length of each of paths 242 and 244 at the center of joint 240. The total number of depressions 248 within joint 240 may be a function of the number of paths 242 and 244 making up joint 240.

For example, the total number of depressions 248 may be at least partially defined by the following equation EQ. 1:

$$D_{248}=2(P_{242} \times P_{242})-P_{242}-P_{242} \qquad \text{EQ. 1}$$

wherein:
$D_{248}$ is the number of depressions 248;
$P_{242}$ is the number of paths 242; and
$P_{244}$ is the number of paths 244.

In the illustrated example having an equal number of paths 242 and 244 (e.g., four paths each), the total number of depressions 248 is twenty-four. In this example, half of depressions 248 may have floors formed by paths 242, while the other half of depressions 248 may have floors formed by paths 244. It should be noted, however, that the number of depressions having floors made from the respective paths 242, 244 need not be equal and, in such a situation, depressions 248 would have floors disproportionally formed by paths 242 and 244.

Depressions 248 (e.g., four depressions 248 in the example of FIG. 11A) that lie within a common spacing between adjacent paths 242 may together with the spacing form an undulating trough 250. Similarly, depressions 248 (e.g., four depressions 248 in the example of FIG. 11A) that lie within a common spacing between adjacent paths 244 may together with the spacing form an undulating trough 252. Each trough 250 may intersect with all of troughs 250, and vice versa.

As shown in FIG. 11B, one or more additional paths 254 may be initially deposited within a second layer of structure 12 along the same first and second branches of joint 240 that are formed by paths 242 (e.g., on top of paths 242, at least at the a- and b-portions). It should be noted that the number of paths 254 making up the first and second branches of joint 240 within the second layer of structure 12 should be different than the number of paths 242 making up the same branches in the first layer. Instead, the number of paths 254 should be equal to the number of spacings between paths 242. For example, three paths 254 (e.g., one path fewer than in the first layer of paths 242 making up the first and second branches of joint 240) are shown. It is contemplated that in some applications, paths 254 could be greater in number (e.g., one more) than the number of paths 242, if desired.

Like paths 242, each of paths 254 may also have a generally consistent width and thickness (e.g., generally equal to the thickness of paths 242 and the width of spacings between paths 242) and, at the a- and b-portions, lie generally parallel and immediately adjacent (e.g., without spacing therebetween) to each other within the second layer. Also like paths 242, at least some (e.g., the outer two) paths 254 may deviate outward away from the center of joint 240. For example, the outer two paths 254 may deviate by an amount required to align them with the outer two troughs 250 formed in the first layer of structure 12 along the same first and second branches of joint 240. The center path 254 may not deviate, but instead pass straight through joint 240 along the axis of the first and second branches and align with the center trough 250.

Like the other paths, a spacing between adjacent paths 254 at the center of joint 240 may be about equal to or greater than a width of the individual paths 254 bordering the spacing. Paths 254 and the spacings therebetween may be generally parallel with each other at the center of joint 240 and also parallel with the a- and b-portions of the same paths 254 and the underlying paths 242. Due to the spaced-apart nature of paths 254 at the center of joint 240, the corresponding branches may taper and converge outside of the center towards the a- and b-portions of paths 254. The tapering may be centered about the axial direction of the branches or asymmetric, as desired.

The portions of paths 254 within the center of joint 240 may be pressed during deposition into the undulating troughs 250 with which they are aligned. That is, the center portions of paths 254 may be pressed from the second layer of structure 12 into the first layer (e.g., at the lowest points of troughs 250), to fill the spacings between paths 242. Accordingly, after deposition of paths 254, upper surfaces of paths 254 should undulate as they fill the spacing between paths 242 and cross over paths 244. After deposition of paths 254, only troughs 250 should remain and no longer be undulating (i.e., troughs 254 may now have a continuous floor formed by paths 242 and paths 254.

As shown in FIG. 11C, one or more additional paths 256 may be initially deposited within a second layer of structure 12 along the same third and fourth branches of joint 240 that are formed by paths 244 (e.g., on top of paths 244, at least at the a- and b-portions). It should be noted that the number of paths 256 making up the third and fourth branches of joint 240 within the second layer of structure 12 should be different than the number of paths 244 making up the same branches in the first layer. For example, three paths 256 (e.g., one path fewer than in the first layer of paths 244 making up the third and fourth branches of joint 240) are shown. It is contemplated that paths 256 could be greater in number (e.g., one more) than the number of paths 244, if desired.

Like paths 244, each of paths 256 may also have a generally consistent width and thickness (e.g., generally equal to the thickness of paths 244 and the width of spacings between paths 244) and, at the a- and b-portions, lie generally parallel and immediately adjacent (e.g., without spacing therebetween) to each other within the second layer. Also like paths 244, at least some (e.g., the outer two) paths 256 may deviate outward away from the center of joint 240. For example, the outer two paths 256 may deviate by an amount required to align them with the outer two troughs 252 formed in the first layer of structure 12 along the same third and fourth branches of joint 240. The center path 256 may not deviate, but instead pass straight through joint 240 along the axis of the third and fourth branches and align with the center trough 252.

Like the other paths, a spacing between adjacent paths 256 at the center of joint 240 may be about equal to or greater than a width of the individual paths 256 bordering the spacing. Paths 256 and the spacings therebetween may be generally parallel with each other at the center of joint 240 and also parallel with the a- and b-portions of the same paths 256 and underlying paths 244. Due to the spaced-apart nature of paths 256 at the center of joint 240, the corresponding branches may continue to taper and converge outside of the center towards a- and b-portions of paths 256. The tapering may be centered about the axial direction of the branches or asymmetric, as desired.

The portions of paths 256 within the center of joint 240 may be pressed during deposition into the no-longer undulating troughs 252 with which they are aligned. That is, portions of paths 256 may fill the spacings between paths 244. Accordingly, after deposition of paths 256, upper surfaces of paths 256 should lie within the same plane as upper surfaces of paths 244, at the center of joint 240. This may be true even though paths 256 at the a- and b-portions may lie on top of paths 244. After deposition of paths 256, the center of joint 240 should have a flat, smooth upper surface (i.e., without undulations, bumps, or troughs) and a thickness of two layers (i.e., 2 t. Similarly, the a- and b-portions of each of the branches of joint 240 should have a thickness of 2 t. The above-described pattern of discharging two layers of material along four branches may be repeated to further build up structure 12, without building up joint 240 at a faster rate.

It should be noted that FIGS. 11A-C are not necessarily produced to scale. For example, the spacing between adjacent tracks is shown as extending a distance past where paths of material overlap. This is for clarity purposes only. In practice, the length of these spacings may be reduced to inhibit void formation. It is contemplated that, in some applications, void formation at joints may be further reduced by selectively increasing an amount of matrix discharged along with reinforcement. The excess matrix may fill any voids, thereby increasing a strength of the joints.

It should be noted that, during deposition of material by machine 14 at joint 240, a density of structure 12 may vary. For example, due to the spaced-apart nature of the paths initially deposited at the center of joint 240, the center may initially have a lower density (i.e., amount of discharged material per volume of space) than the branches of the same joint. Then, as described above, during subsequent passes of machine 14, the lower-density center of joint 240 may be selectively filled in. As such, by completion of joint 240, the center may eventually have a density that is roughly the same as the density within the branches. This may translate to a void content that is roughly the same, resulting in similar structural properties throughout the joint and the rest of structure 12.

It should be noted that the principles discussed above in connection with the four-way orthogonal branching joint 240 of FIGS. 11A-11C may similarly be applied to other designs. For example, the branches could extend from joint 240 at any desired angles. Additionally or alternatively, any one of the branches could be omitted by terminating the corresponding paths at the boundary of overlap (e.g., to form a 3-way branching joint). Similarly, additional branches could be added, if desired. Finally, any number of the branches, instead of passing in straight-line fashion through joint 240, could follow a curving trajectory.

Figure 14:
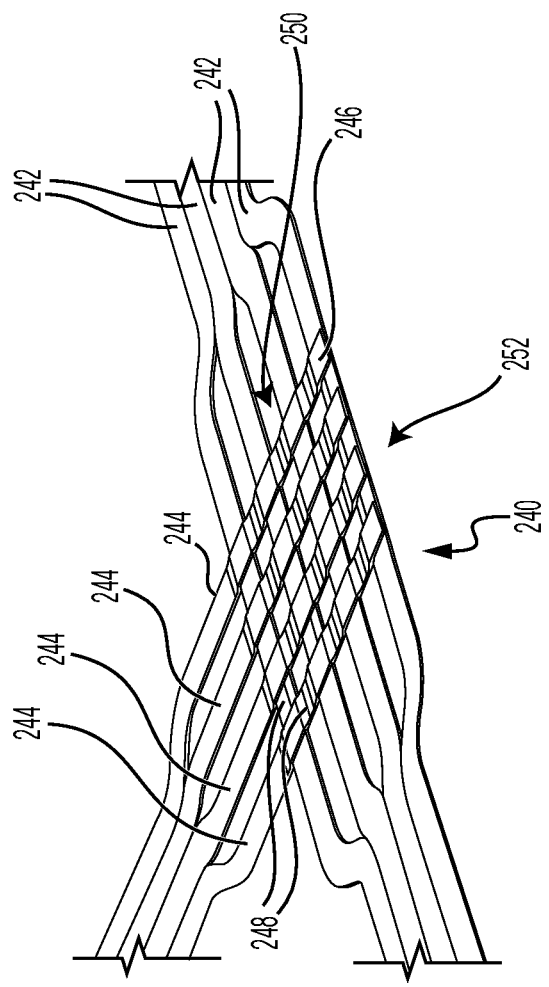

FIG. 14 illustrates an exemplary three-way joint 140 that may be formed in a manner similar to that used to form joint 140 of FIG. 11C. In this example, the fourth branch is simply omitted. That is, paths 244 and 256 may start with the a-portion and extend through the center of joint 240, but omit the b-portion (or vice versa). In this configuration, paths 244 and 256 may include only a single tapered area (i.e., at the transition between the a-portion and the center of the joint). This may result in abrupt termination of paths 244, while still providing a strong connection to paths 242 and 254.

FIG. 15 illustrates fabrication of a further exemplary three-way joint 440. In this embodiment, joint 440 is formed over two-layers and relies on an overlapping butt-style connection between branches. For example, material may be deposited within a first layer (far-left) along a first path 462 that extends entirely through joint 440 along first and second branches, from the a-portion through the b-portion. Within this same layer, a second path 464 of material may be deposited along a third branch and extend from the a-portion only into the center of joint 440 (i.e., path 464 may not include a b-portion that extends away from the center of joint 440). The center portion of path 464 may lie generally parallel to, abut, and be bonded to the center portion of path 462. An interior angle between the first and third branches may generally be acute.

It should be noted that, while path 462 may form two branches in the first layer of joint 440, these branches may not necessarily lie along a common axis. For example, the a-portion of path 462 forming the first branch may be parallel to the b-portion forming the second branch, but transversely offset (e.g., stepped to the side away from path 464) within the same layer. The offsetting dimension of the a-portion may be about equal to a width of path 462, allowing for an interface at the butt joint between paths 462 and 464 to lie within the same plane as the right-hand surface (i.e., surface opposite path 464) of the portion of path 462. In this example, the step may be located at a b-side of the center of joint 440.

The second layer (middle image of FIG. 15) of joint 440 may be formed by depositing material along a third path 466 that extends entirely through joint 440 along the third and second branches, from the a-portion through the b-portion. Within this same layer, a fourth path 468 of material may be deposited along the first branch and extend from the a-portion only into the center of joint 440 (i.e., path 468 may not include a b-portion that extends away from the center of joint 440). The center portion of path 468 may lie generally parallel to, abut, and be bonded to the center portion of path 466.

It should be noted that a terminus of path 464 within the center of joint 400 does not align/overlap with a terminus of path 468. This may enhance a strength of joint 440. In addition, because the terminuses of paths 464 and 468 are supported by continuous underlying/overlapping paths, the strength of joint 440 may be further enhanced. It should be noted that due to the termination of paths at the center of joint 440 (and associated voids left empty or filled with matrix), the density of reinforcements at the center of joint 440 may be less than other locations within the respective paths (e.g., within branches of joint 440).

Path 466 located in the second layer may overlap at least some portions of all of the paths discharged in the first layer. For example, the a-portion and center portion of path 466 may overlap the a-portion and center portion of path 464. However, the b-portion of path 466 may overlap the b-portion of path 462. In this manner, path 466 may provide additional bonding and stiffness between paths 462 and 464.

The offsetting of path 462 between it's a- and b-portions may allow path 466 to smoothly transition (i.e., transition without a step) from path 464 to path 462. However, it is contemplated that path 462 could pass in a straight-line fashion axially through the center of joint 440, and path 464 could instead be the path that is offset (e.g., stepped to the left). This, however, might require path 466 to likewise step to the left in order to maintain overlapping alignment with paths 462 and 462.

In a manner similar to that described above, path 462 of the first layer may lie under at least some portions of all of the paths discharged in the second layer. For example, the a-portion and center portion of path 462 may lie under the a-portion and center portion of path 468. However, the b-portion of path 462 may lie under the b-portion of path 466. In this manner, path 462 may provide additional bonding and stiffness between paths 466 and 468.

The joint design of FIG. 15 may allow uniformity of branch dimensions across joint 440. For example, each of the first through third branches have a width that is only a single path wide (i.e., 1 w). However, the center of joint 440 may have a width that is twice as wide as any one branch or path (i.e., 2 w).

In some applications it may be desirable to have branches of differing dimensions. FIG. 16 illustrates an example joint 550, where the second branch is twice as wide as either of the first and third branches and the same width as the center of the corresponding joint. In addition, in this example, at least one layer of joint 550 may include paths that are all continuous through the joint. These continuous paths may increase a strength of the joint.

For example, as shown in FIG. 16, each of paths 462 and 464 pass completely through the center of joint 550 and both include a-portions, b-portions, and center portions. In addition, paths 462 and 464 may lie adjacent to, parallel with and bonded to each other along the entirety of the b- and center portions of joint 550. Accordingly, the second branch of this example, has a width of 2 w.

In this same example, the second layer may be fabricated from three distinct paths. Path 466 may include only b- and center portions that overlap with the b- and center portions of underlying path 464. Path 468 may include only the a-portion that overlaps with the a-portion of underlying path 462. An additional path 470 may include an a-portion that overlaps with the a-portion of underlying path 464, a b-portion that overlaps with the b-portion of underlying path 462, and a center portion that crosses over some of the center portions of both underlying paths 462 and 464. By crossing over both underlying paths, a strength at the center of joint 550 may be improved. In addition, a void content at the center of joint 550 may be less than that of joint 440. Like joint 440, because the terminuses of paths 466 and 468 are supported by continuous underlying/overlapping paths, the strength of joint 550 may be enhanced.

Figure 17:
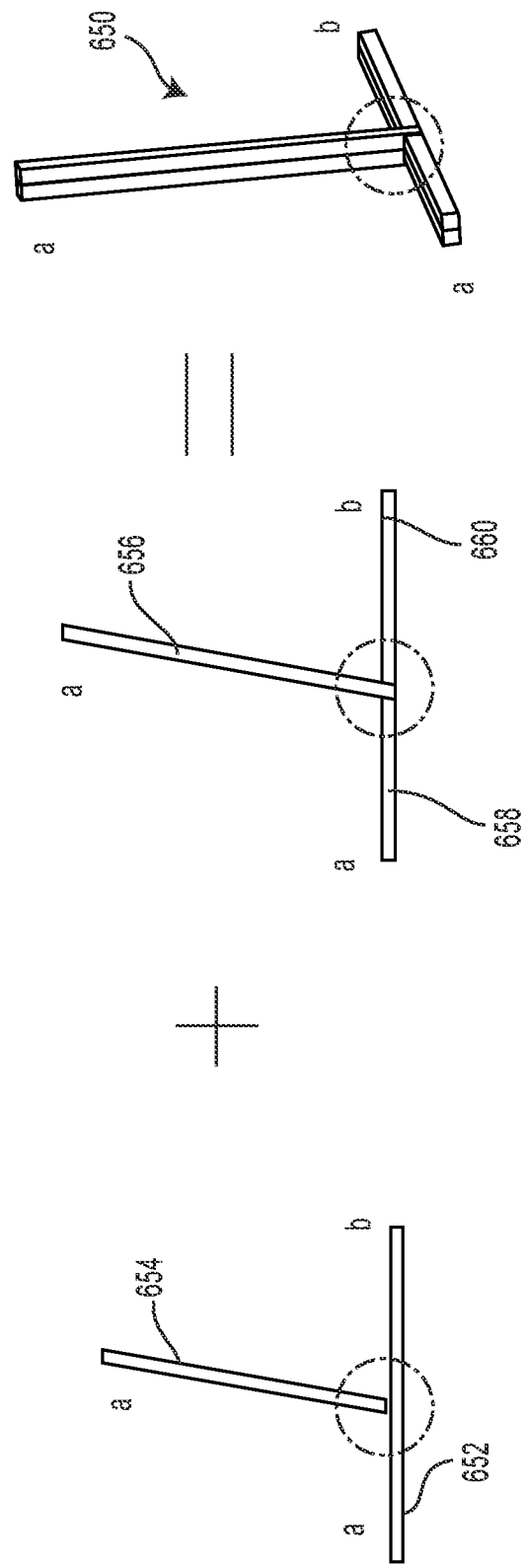

FIG. 17 illustrates a further example of a three-way T-shaped joint 650 that is similar to joint 140 shown in FIG. 6. Like the embodiment shown in FIG. 6, it should be noted that joint 650 need not have orthogonally intersecting straight-line branches. That is, the three branches of joint 650 may intersect at any desired angle and having curving trajectories, if desired.

In the embodiment of FIG. 17, joint 650 may be fabricated via alternating layers having two and three paths, respectively. For example, a first layer (left-most image of FIG. 17) may include a first path 652 passing through the center of joint 650 to form the spine of the T-shape, and a second path 654 abutting the first path at the center and forming the leg of the T-shape. It should be noted that, while the a- and b-portions of path 652 are aligned along a common axis, it is contemplated that one or both of the a- and b-portions could be curved, angled, and/or offset from each other. Similarly, while path 654 only has an a-portion extending from the center of joint 650, path 654 could be straight, curved, orthogonal, angled, etc. The tip end of path 654 at the center of joint 650 may touch and be bonded to the center portion of path 652.

The second layer (middle image of FIG. 17) of joint 650 may include third, fourth, and fifth paths 656, 658 and 660, none of which pass completely through the center of joint 650. In this embodiment, the fourth path 656 overlaps all of underlying path 654 and cantilevers further into the center of joint 650 (e.g., at least partially over or completely over path 652). Paths 658 and 660 may overlap the a- and b-portions, respectively, of underlying path 652 and extend inward to the center of joint 650 to abut sides of path 656. Each of paths 656-660 may be bonded to the underlying paths. Paths 658 and 660 may additionally be bonded at their centers to opposing sides of path 656 at its center.

The abutment locations between paths of adjacent layers within joint 650 may misalign with each other. This may reduce stress risers within joint 650, thereby increasing a strength and toughness of joint 650.

In a variant of joint 650 (not shown), it is contemplated that path 656 could pass completely through the center of joint 650 within the second layer to form a fourth branch, if desired. In this example, an additional path (not shown) may be discharged within the first layer at a side of path 652 opposite path 654. Path 656, having extended completely through the center of joint 650 would include a-, b-, and center portions that overlap and are bonded to the a-portion of path 654, the center portion of path 652, and the b-portion of the additional path, respectively. As with joint 650, the staggering of abutment locations between layers of the new four-way joint may increase a strength, stiffness, and/or toughness of the joint.

Figure 18:
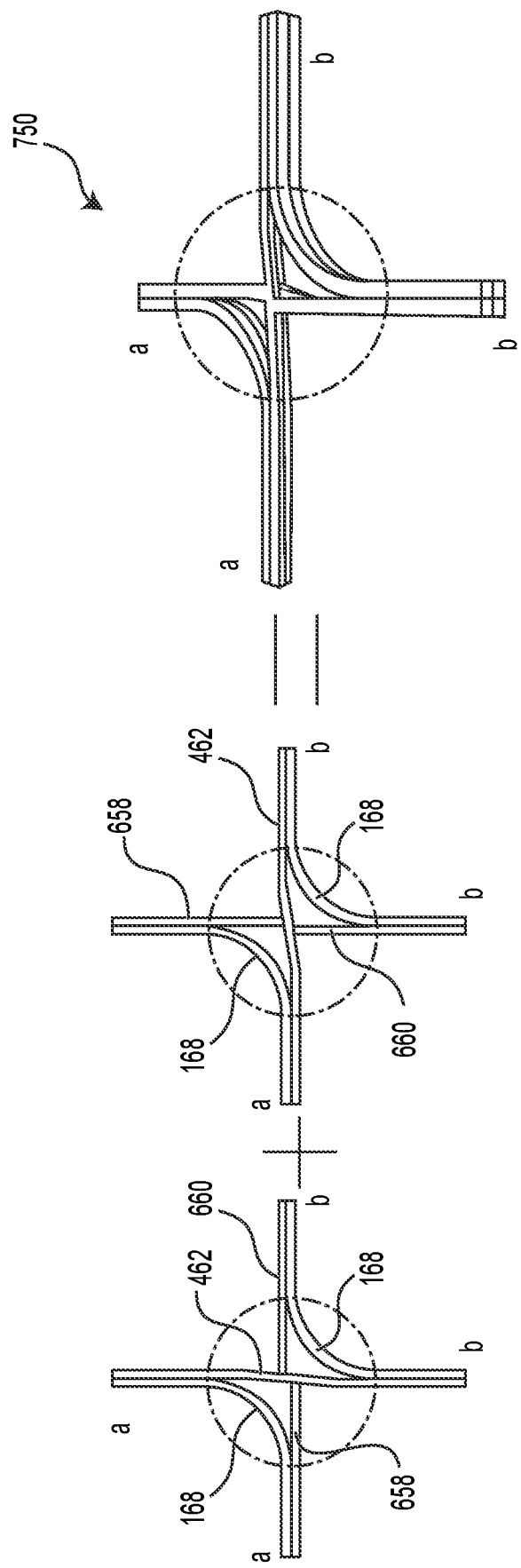

FIG. 18 illustrates an example of a four-way joint 750 that may be fabricated by system 10 as part of structure 12. As will be explained in more detail below, joint 750 may include a combination of features found in joint 140 of FIG. 9 (e.g., filleting), joint 440 of FIG. 15 (e.g., offset staggering), and the variation of joint 650 described above (alternating straight-line pass-through). For example, joint 750 may be fabricated over two layers, each consisting of the same number, types and layouts of different paths. These paths may include, for example, one path 462 that passes through the center of joint 750 and offsetting to one side (e.g., to the left, when passing from the a-portion to the b-portion); paths 658 and 660 that extend from their a- and b-portions, respectively, into the center of joint 750 to abut opposing sides of path 462; and two filleting paths 168 that connect b-portions of paths 462 and 660 to each other and a-portions of paths 462 and 658 to each other. In this example, the second layer, while having the same number, types, and layout of paths as the underlying first layer, may be mirrored across a diagonal of joint 750 (or mirrored twice, first across a horizontal axis passing through passages 658 and 660 and again across a vertical axis passing through path 462), such that staggard path 462 of the second layer overlaps with underlying paths 658 and 660 of the first layer. This overlapping of a continuous path with discontinuous paths may strengthen joint 750. Filleting paths 168 may also increase a rigidity of joint 750. By switching the location of the continuous staggard path 462 and abutting paths 658, 660 between layers, the abutting locations may be misaligned. This may further increase a strength of joint 750.

Filleting paths 168 may increase a strength of the associated joint. It should be noted that while only two interior corners of joint 750 are shown as being filled with paths 168, it is contemplated that fewer (e.g., only one) or more (e.g., three or four) corners may be filled with paths 168.

Filleting paths 168 also increase a dimension (e.g., a width or diameter) of the joint at its center. The example joint illustrated in FIG. 19 may provide a four-way joint 850 having a smaller center. Joint 850 may include a plurality of different paths (represented by solid lines) deposited adjacent each other along multiple different axes (e.g., straight orthogonal axes, although non-orthogonal and/or curving trajectories are contemplated) to form any number of overlapping layers, each having multiple branches. As shown in the top-left example layer of FIG. 19, the paths may include a single path 852 that passes in straight-line fashion completely through each layer of joint 850 and includes the a-portion, the center portion, and the b-portion. The remaining paths of each layer may all terminate at particular locations within the center of joint 850.

Figure 19:
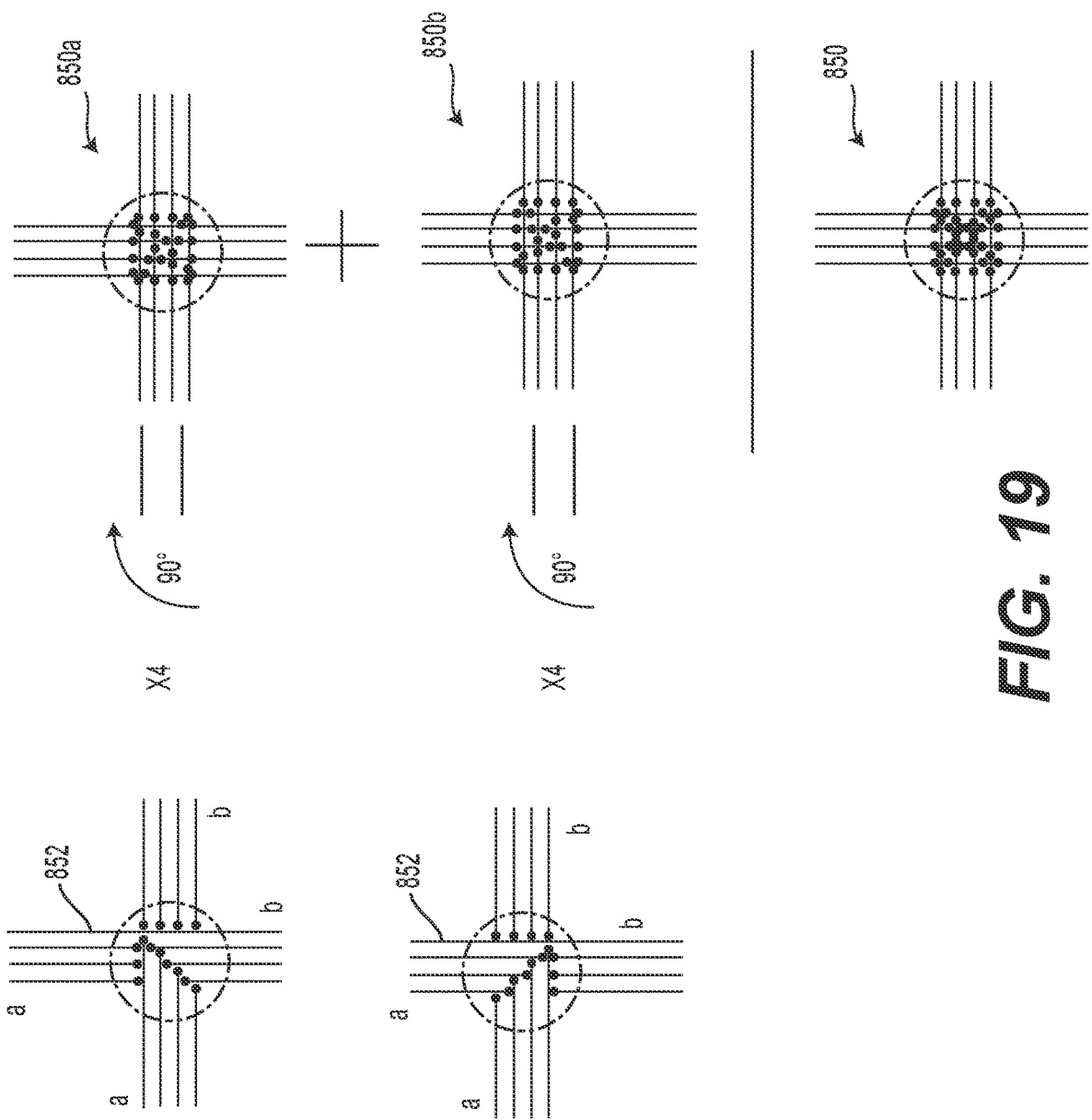

In the depicted example, path 852 is oriented vertically relative to the perspective of FIG. 19, and forms first and second branches that correspond with the a-portion and the b-portion, respectively. The remaining passages in the first branch may terminate at a same vertical location and each abut a single (e.g., upper-most) path within a third (e.g., left-most horizontal) branch. The remaining paths in the second branch may all terminate at different vertical locations, such that each of these paths abuts a different path within the third branch. In this configuration, the abutment locations of the paths in the second branch (i.e., against the paths in the third branch) may form a first diagonal (e.g., mitered and staggered or interlocking) pattern across the center of joint 850 within the first layer. Similarly, the paths in the third branch may all terminate at different horizontal locations, such that each of these paths abuts a different path within the second branch. In this configuration, the abutment locations of the paths in the third branch (i.e., against the paths in the second branch) may also form a second diagonal pattern across the center of joint 850 within the first layer—this pattern may be generally aligned with the first diagonal pattern. All of the paths in the fourth (e.g., right-most horizontal) branch may terminate at a same horizontal location and each abut the one continuous path 852 of the first and second branches.

It should be noted that the abutments described above are represented in FIG. 19 as solid circles positioned at the end of one path in one branch and at a side of another path in an adjacent branch. Joint 850 may be formed without any paths of any single layer overlapping another path of the same layer. While adjacent paths of the same branch are shown as separated by a white space in FIG. 19, this is for clarity purposes only. These adjacent paths may be touching and bonded to each other along their lengths. Accordingly, the center of joint 850 and each branch within a given layer may be substantially void-free and have a common thickness in an out-of-plane direction.

The pattern of the first example layer described above may be duplicated, rotated (e.g., 90° or 180° clockwise) and used to fabricate a second layer that overlaps the first layer. This process may be performed any number of times (e.g., two or four times) in subsequent layers to create a subjoint 850*a*. By rotating the pattern for each subsequent layer, the termination locations of individual paths within the center of joint 850 do not overlap between layers. This may increase a strength of joint 850.

Similarly, the pattern of the first example layer described above may be mirrored (e.g., across a horizontal and/or vertical axis, relative to the perspective of FIG. 19) to form a different first layer (e.g., the middle-left layer). The pattern of the different first layer may be duplicated, rotated, and used to fabricate a different second layer that overlaps the different first layer. This process may be performed any number of times in subsequent layers to create a subjoint 850*b*.

It is contemplated that subjoint 850*a* may be used alone (e.g., joint 850*a* may consist of 1, 2, 3, or 4 layers, each clocked relative to an overlapping layer). It is also contemplated that each subjoint 850*a* may be repeatedly overlapped with itself to form joint 850 (e.g., joint 850 may consist of a repeated pattern of clocked layers). It is further contemplated that one or more subjoints 850*a* may be interleaved with any number of subjoint 850*b* to form joint 850. Finally, it is contemplated that layers of subjoint 850*a* may be selectively interleaved with layers of subjoint 850*b* to form joint 850. Other combinations may also be possible.

It is also contemplated that a three-way joint may be formed in a way similar to that used to form the four-way joint 850. For example, the first and different first layers shown at the left side of FIG. 19 may be selectively overlapped, while simultaneously omitting the b-portions in the fourth branch. In a further example having only three branches, where the three branches are oriented at equal angles relative to each other (e.g., not at 90° to form a T-shape), the pattern of the illustrated first-third branches could be clocked 120° and repeatedly overlapped (e.g., while omitting the fourth branch).

It will be appreciated that, in some examples, each of the paths may terminate within the center of joint 850 in a different manner and need not be arranged in the mitered configuration described above. For example, adjacent paths may terminate in an undulating manner, with one path extending further into the center of joint 850 than either adjacent path located at opposing sides. Further, rather than a single-mitered pattern, a dual-mitered or arrowhead pattern could be formed with the termination locations of adjacent paths.

Another example of a four-way joint 940 is illustrated in FIG. 20. As shown in FIG. 20, each layer (two layers shown) of joint 940 may include a plurality of different paths (e.g., 4 paths—represented by solid lines) 942 deposited along multiple (e.g., two) different axes (e.g., straight orthogonal axes, although non-orthogonal and/or curving trajectories are contemplated) to form multiple (e.g., four) branches. As shown in the left-most example layer of FIG. 20, paths 942 may include a single configuration having only an a-portion deposited along each branch, and a center portion angled toward an adjacent branch at an oblique (e.g., 135°) angle. For example, each path 942 may deviate in a counterclockwise direction toward the adjacent branch, although the opposite deviation direction may also be possible. A terminus of each path 942 located at the center of joint 940 may abut and be bonded to the path 942 of the adjacent branch at or near (from inward of) a vertex, where the adjacent branch changes trajectory. When abutting inward (e.g., closer to the center of joint 940) of the vertex, a shape (e.g., a polygon) having sharper corners may be possible.

Each path 942 within each layer may be substantially identical—just positioned with it's a-portion aligned along a different branch. With this configuration, a diamond opening may be formed at the center of joint 940, within each layer. As shown in the center example layer of FIG. 20, the pattern used to fabricate the first layer of joint 940 may be mirrored (e.g., across a vertical axis passing through two branches of the joint), such that the deviation of each path 942 towards the adjacent path may be in a clockwise direction. In this manner, the terminus of each path 942 at the center of the joint does not line up with the terminus of any paths in the adjacent and overlapping layer.

It is contemplated that a three-way joint may be fabricated in a manner similar to the manner in which the four-way joint 940 is fabricated. For example, rather than having each path bend through a 135° toward an adjacent path, each path may instead bend through a 150° degree angle. Other joints having a different number of branches may similarly be formed.

Figure 22:
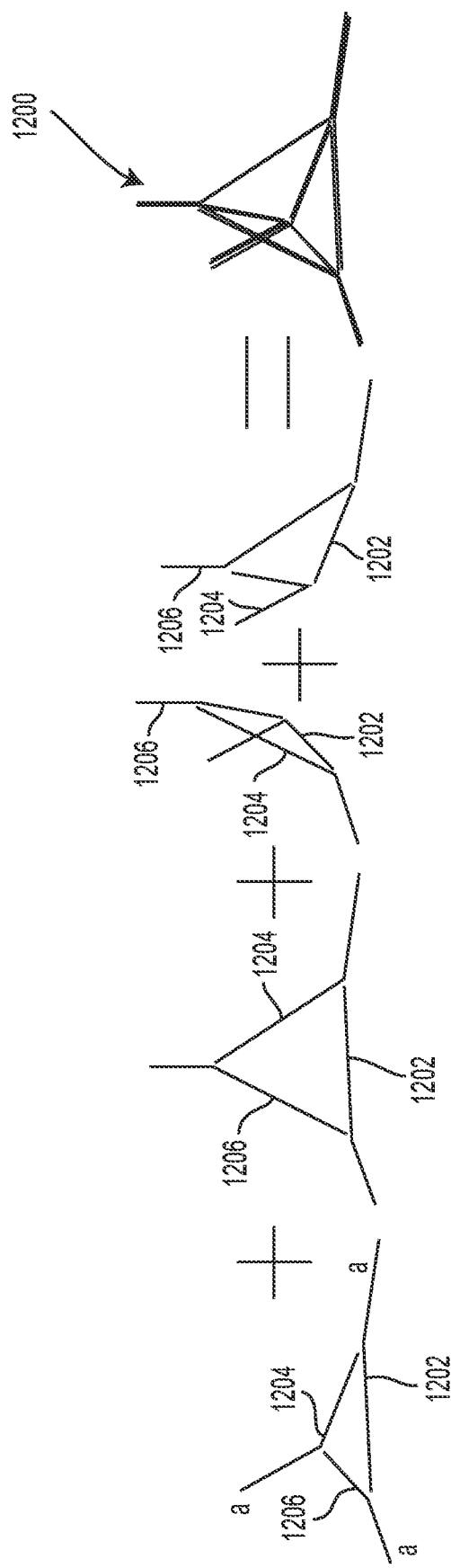
FIG. 22 is a final diagrammatic example of a 3D or free-space joint that may be fabricated by the system of FIGS. 1 and 2 and incorporated into the structure of FIG. 3.

A final exemplary joint 1200 is illustrated in FIG. 22. In this example, joint 1200 is a 3D or free-space joint. It should be noted that, while any of the aforementioned joints could be 3D joints, in that any one or more of the branches of such joints could be non-planar and discharged against a contoured surface, joint 1200 is different. For example, one or more branches of joint 1200 may extend through free-space and be unsupported along their length(s) by an adjacent surface. In addition, a center of joint 1200 may include not just an aperture that passes through one or more overlapping layers, but an enclosed volume. It is contemplated that, in some embodiments, joint 1200 could be formed without an aperture or enclosed volume (e.g., consider just one vertex of joint 1200 as a stand-alone joint), if desired.

In the disclosed embodiment, joint 1200 is depicted as a tetrahedron. It should be noted, however, that joint 1200 could have other shapes, if desired. For example, joint 1200 could embody a pyramid, an octahedron, a cube, a cone, etc.

As a tetrahedron, joint 1200 may include four triangular faces. These faces may include a base face (left-most image of FIG. 22), and three inclined faces that extend from edges of the base face away from a plane of the base face. A vertex of each of the inclined faces located furthest from the base face may be joined together. Each of the inclined faces may include two inclined edges, each edge being connected to an inclined edge of another of the inclined faces.

Each face of joint 1200 may be formed via three paths 1202, 1204, and 1206. Each path may include an a-portion and a center portion, but not b-portion. The a-portion of each path may diverge away from the center portion at an angle corresponding to a shape of joint 1200. In the disclosed example, the angle of divergence may be 120°. The terminus of each path located at the center of joint 1200 may abut and be bonded to the side of an adjacent path (e.g., at or inward of the adjacent path's vertex). It should be noted that, while spaces are shown at these terminuses for clarity purposes (e.g., to show where each path ends), such spaces would generally not exist.

The base face may be fabricated first, as access to this layer of material may be inhibited by fabrication of the other faces. While the base face depicted in FIG. 22 is shown as being generally planar, it should be noted that other non-planar designs are possible. One or more (e.g., all) of paths 1202-1206 in the base face may be supported by an adjacent (e.g., underlying) surface of structure 12 (e.g., as in an isogrid configuration). It should be noted that, while only a single layer of material is shown as being deposited within the base face, any number of layers may be fabricated in overlapping manner prior to fabrication of the inclined faces. In this situation, each layer may be clocked relative to an adjacent layer, such that terminuses do not align between layers.

Formation of an exemplary inclined face is illustrated in the second-from-left image of FIG. 22. As shown in this image, only one of the paths (e.g., path 1202) may completely overlap an underlying layer. As such, this path should be deposited first. Only one path (e.g., path 1204) may include an overlapping a-portion and an unsupported center—this path should be deposited second (starting with the a-portion). The remaining path (e.g., path 1206) may be completely unsupported (other than at its vertices) and deposited last. It should be noted that path 1202 should be oriented to bridge a terminus between abutted paths (e.g., where the center portion of path 1202 abuts the vertex of path 1206) within an immediate adjacent layer of the base face.

Formation of the remaining inclined faces may be formed by repeating the pattern described above for the first inclined face, after clocking path 1202 to a different edge of the base face. For example, the pattern of the first inclined face may be rotated clockwise, from the orientation where the center portions of overlapping paths 1202 in the first inclined and base faces are aligned to an orientation where the center of path 1202 in the second inclined face is aligned and overlaps with the center portion of path 1206 in the base face (see third-from-left image). This may be repeated again (e.g., to align the center of path 1202 in the third inclined face with the center of path 1204 in the base face) during formation of the third inclined face (see fourth-from-left image).

The resulting tetrahedron joint 1200 includes four branches that each have at least three layers of material touching and bonded to each other. Three of these branches are supported directly by and bonded to the underlying surface of structure 12, while the fourth branch extends into free space. Three center portions of joint 1200 may likewise be supported directly by and bonded to the underlying surface and extend between the three supported branches, while three other center portions may extend through free-space from each of the three supported branches to the fourth branch. Each of the center portions may include fewer layers than the branches (e.g., only two layers touching and bonded to each other). It should be noted that segments (e.g., only center portions) of additional paths (not shown) could be selectively added to the center portions of joint 1200 to build up these portions (with or without building up any of the branches), if desired.

It will be apparent to those skilled in the art that various modifications and variations can be made to the disclosed systems and methods. While in the above examples, a structure 12 has been described that principally may be used for the purposes of fabricating an aircraft wing, it will readily be appreciated that similar structures may be fabricated for use as other structural components of an aircraft (e.g., fuselage, elevators, etc.). Further, such structures comprising joints as describe above may be fabricated for alternative uses (e.g., automotive structures or the like). Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A method of additively manufacturing a structural joint within an object using a composite material, comprising:
   depositing a first path of the composite material within a first layer at the joint to at least partially form one or more branches, the first path having:
   a center portion at a center of the joint;
   a first portion integral with the center portion and extending away from the center portion, and
   a second portion integral with the center portion and extending away from the center portion opposite the first portion; and
   depositing a second path of the composite material within the first layer at the joint to at least partially form one or more branches, the second path having:
   a center portion at the center of the joint; and
   a first portion integral with the center portion of the second path and extending away from the center portion of the second path,
   wherein the center portion of the second path is parallel with, abuts and is bonded to the center portion of the first path,
   depositing at least one path of the composite material within a second layer at the joint,
   wherein the at least one path in the second layer forms branches differing from branches formed in the first layer by either of the first or second paths.

2. The method of claim 1, wherein:
   the first portion of the first path at least partially forms a first branch of the joint;
   the second portion of the first path at least partially forms a second branch of the joint; and
   the first portion of the second path at least partially forms a third branch of the joint.

3. The method of claim 2, wherein each layer of the joint includes a singular path that is continuous through multiple of the first, second, or third branches.

4. The method of claim 1, wherein a trajectory of the second portion of the first path deviates from a trajectory of the first portion of the first path.

5. The method of claim 4, wherein the second portion of the first path is offset transversely within the first layer relative to the first portion of the first path.

6. The method of claim 1, wherein depositing at least one path of the composite material within a second layer further includes depositing a third path into the second layer at the joint, the third path having:
   a center portion at the center of the joint;
   a first portion integral with the center portion of the third path and extending away from the center portion of the third path, and
   a second portion integral with the center portion of the third path and extending away from the center portion of the third path opposite the first portion.

7. The method of claim 6, wherein the first portion of the third path overlaps and is bonded to the first portion of the second path.

8. The method of claim 7, wherein the second portion of the third path overlaps and is bonded to the second portion of the first path.

9. The method of claim 8, further including depositing a segment to overlap and bond to the first portion of the first path, wherein a terminus of the segment is located at the center of the joint and abuts and is bonded to a side of the third path.

10. The method of claim 9, further including depositing additional first and second paths on top of the third path and the segment.

11. The method of claim 6, wherein the second path includes a second portion that is parallel with, abuts, and is bonded to the second portion of the first path.

12. The method of claim 11, wherein the first portion of the third path overlaps and is bonded to the first portion of the second path.

13. The method of claim 12, wherein the second portion of the third path overlaps and is bonded to the second portion of the first path.

14. The method of claim 13, further including depositing a first segment into the second layer to overlap and bond to the first portion of the first path.

15. The method of claim 14, further including depositing a second segment into the second layer to overlap and bond to the second portion of the second path.

16. The method of claim 15, wherein terminuses of the first and second segments are located at the center of the joint and abut and are bonded to opposing sides of the third path.

17. The method of claim 6, wherein:
   the first layer of the joint includes multiple paths that are continuous through multiple branches of the joint; and
   the second layer includes a singular path that is continuous through multiple branches of the joint.

18. A method of additively manufacturing a structural joint within an object using a composite material, comprising:
   depositing a plurality of paths at the joint in a first layer to form a plurality of branches that extend outward from a center of the joint; and
   depositing a plurality of paths at the joint in a second layer to form the plurality of branches that extend outward from the center of the joint,
   wherein:
   at least one of the plurality of paths in each of the first and second layers terminates at the center of the joint;
   at least one of the plurality of paths in each of the first and second layers is continuous through multiple branches;
   the at least one of the plurality of paths that terminates at the center of the joint forms a different one of the plurality of branches in the first and second layers.

19. The method of claim 18, wherein:
   the at least one of the plurality of paths that terminates at the center of the joint in the second layer overlaps the at least one of the plurality of paths that is continuous through multiple branches in the first layer; and the at least one of the plurality of paths that is continuous through multiple branches in the second layer overlaps the at least one of the plurality of paths that terminates at the center of the joint in the first layer.

\* \* \* \* \*